US011763688B2

(12) United States Patent
Luetjen et al.

(10) Patent No.: US 11,763,688 B2
(45) Date of Patent: Sep. 19, 2023

(54) NAVIGATION FOR TABLE OF CONTENTS AND LEARNING OUTCOMES

(71) Applicant: Pearson Education, Inc., Bloomington, MN (US)

(72) Inventors: Jamie Luetjen, Centennial, CO (US); Karen Taxier, Highlands Ranch, CO (US)

(73) Assignee: PEARSON EDUCATION, INC., Bloomington, MN (US)

( * ) Notice: Subject to any disclaimer, the term of this patent is extended or adjusted under 35 U.S.C. 154(b) by 0 days.

(21) Appl. No.: 17/502,480

(22) Filed: Oct. 15, 2021

(65) Prior Publication Data

US 2022/0122475 A1   Apr. 21, 2022

Related U.S. Application Data

(60) Provisional application No. 63/092,773, filed on Oct. 16, 2020.

(51) Int. Cl.
| | | |
|---|---|---|
| *G06F 3/048* | (2013.01) | |
| *G09B 5/02* | (2006.01) | |
| *G06F 3/0482* | (2013.01) | |
| *G06F 9/451* | (2018.01) | |
| *G06F 3/0483* | (2013.01) | |

(52) U.S. Cl.
CPC .............. *G09B 5/02* (2013.01); *G06F 3/0482* (2013.01); *G06F 3/0483* (2013.01); *G06F 9/451* (2018.02)

(58) Field of Classification Search
CPC ....... G06F 3/0482; G06F 3/0483; G06F 9/451
See application file for complete search history.

(56) References Cited

U.S. PATENT DOCUMENTS

| | | | | |
|---|---|---|---|---|
| 2010/0062753 A1* | 3/2010 | Wen | ...................... | H04M 1/576 455/418 |
| 2012/0226976 A1* | 9/2012 | Wolter | .................. | G06F 3/0483 715/273 |
| 2018/0121496 A1* | 5/2018 | Hayes | ...................... | G06F 40/40 |
| 2018/0350254 A1* | 12/2018 | Taxier | ...................... | G09B 7/07 |

* cited by examiner

*Primary Examiner* — Claudia Dragoescu
(74) *Attorney, Agent, or Firm* — QUARLES & BRADY LLP

(57) ABSTRACT

A system including at least one processor configured to: store learning resources and learning outcome frameworks in a database, which are then selected; map sections of learning resources to associated objectives within learning outcome frameworks; generate a GUI, including access to learning resources and frameworks; receive selection of a learning framework and a learning resource; and in response, generate a framework menu, selectable learning objectives, and an associated resource content, respectively.

18 Claims, 24 Drawing Sheets

CONTENTS
PREFACE
PART 1: CRIME IN AMERICA
 1: WHAT IS CRIMINAL JUSTICE? ←— 1310
 2: THE CRIME PICTURE
 3: THE SEARCH FOR CAUSES —— 1320
 4: CRIMINAL LAW
PART 2: POLICING
 5: POLICING: HISTORY AND STRUCTURE
 6: POLICING: PURPOSE AND ORGANIZATION —— 1330
 7: POLICING: LEGAL ASPECTS
 8: POLICING: ISSUES AND CHALLENGES
PART 3: ADJUDICATION
 9: THE COURTS: STRUCTURE AND PARTICIPANTS —— 1340
 10: PRETRIAL ACTIVITIES AND THE CRIMINAL TRIAL
 11: SENTENCING
PART 4: CORRECTIONS
 12: PROBATION, PAROLE, AND INTERMEDIATE SANCTIONS
 13: PRISONS AND JAILS

——————— VIEW MORE ———————

FIG. 13

NAVIGATION FOR TABLE OF CONTENTS AND LEARNING OUTCOMES

CROSS-REFERENCE TO RELATED APPLICATION(S)

This application claims the benefit of priority from provisional application No. 63/092,773, filed under the same title on Oct. 16, 2020, the entire contents of which is incorporated herein by reference.

FIELD

This disclosure relates to the field of systems and methods configured to allow users to navigate between a table of contents for a learning resource (e.g., an electronic textbook) and learning outcome frameworks including learning objectives associated with the learning resource(s) in order for instructors to determine whether the learning resource satisfies one or more requirements of learning objectives within learning outcome frameworks (e.g., accreditation requirements for state owned schools, medical or nursing boards, etc.).

SUMMARY OF THE DISCLOSURE

The present disclosure provides systems and methods comprising one or more processors which may include server hardware computing devices or client hardware computing devices, and which may be communicatively coupled to a network. At least one processor executes specific computer-executable instructions within a memory that, when executed, may cause the system to perform at least some of the following steps: store learning resources and learning outcome frameworks in database, which are then selected; map sections of learning resources to associated objectives within learning outcome frameworks; generate a GUI, including tabs for learning resources and frameworks; transmit the GUI to a client; receive selection of learning framework, resource, and (sub) objectives; and in response, generate a framework menu, selectable learning (sub) objectives, and an associated resource content, respectively.

In one aspect, the disclosure provides a system comprising a database storing a plurality of learning resources and a plurality of learning outcome frameworks. The database mappa content corresponding to each of the plurality of learning resources to at least one learning objective corresponding to at least one of the plurality of learning outcome frameworks. The system includes at least one processor in communication with the database. The processor is programmed to execute instructions within a memory which, when executed, cause the system to generate a graphical user interface (GUI) for selecting from the plurality of learning resources and the plurality of learning outcome frameworks; receive, via the GUI, a selection of a first learning resource of the plurality of learning resources; automatically generate, for display on the GUI, a menu comprising a learning outcome framework selector; receive, via the GUI, a selection of the learning outcome framework selector; automatically generate a framework menu for selecting a first learning framework from the plurality of learning outcome frameworks; receive, via the GUI, a selection of the first learning outcome framework; automatically generate, for display on the GUI, a first plurality of learning objectives corresponding to the first learning outcome framework; receive, via the GUI, a selection of a first learning objective of the plurality of learning objectives; and automatically generate, for display on the GUI, at least one learning resource content associated in the database with the first learning resource and the first learning objective.

The learning resource table of content selector and the learning framework selector may comprise a tab on the GUI. The menu for selecting a first learning framework from the plurality of learning outcome frameworks comprises a drop-down menu. The menu comprising the learning outcome framework selector further comprises a learning resource table of contents selector. The system may be further programmed to receive a selection of the learning resource table of contents selector, and to automatically display of table of contents corresponding to the first learning resource, and to visually highlight at least a portion of the table of contents that includes learning resource content that corresponds to a learning objective corresponding to the first learning objective framework.

The at least one learning resource outcome may comprise a plurality of learning resource outcomes, and the system automatically generates GUI element enabling the user to page through the plurality of learning resource contents.

The learning objectives may be associated with a selectable sub-objective selection component, and the system may be further programmed to, upon receipt a selection of the sub-objective selection component, automatically display the sub-objectives corresponding to the associated learning objective. A learning resource content corresponding to a selected learning objective or a selected sub-objective may be displayed upon receiving the selection.

The instructions may further cause the system to receive a selection of the first learning objective; automatically generate, for display on the GUI, a plurality of learning sub-objectives; receive a selection of a learning sub objective in the plurality of learning sub-objectives; and automatically generate, for display on the GUI, a second content associated in the database with the first learning resource and the first learning sub-objective.

The processor may comprise a server in communication with a network, and may be programmed to transmit the GUI to a client device in communication with the network.

In another aspect, the disclosure provides method including the following steps: storing within a database coupled to at least one processor executing instructions within a memory: a plurality of learning resources; and a plurality of learning outcome frameworks, the database mapping content corresponding to each of the plurality of learning resources to at least one learning objective corresponding to at least one of the plurality of learning outcome frameworks; generating a graphical user interface (GUI) for selecting from the plurality of learning resources and the plurality of learning outcome frameworks; receiving, via the GUI, a selection of a first learning resource of the plurality of learning resources; automatically generating, for display on the GUI, a menu comprising a learning outcome framework selector; receiving, via the GUI, a selection of the learning outcome framework selector; automatically generate a framework menu for selecting a first learning framework from the plurality of learning outcome frameworks; receiving, via the GUI, a selection of the first learning outcome framework; automatically generating, for display on the GUI, a first plurality of learning objectives corresponding to the first learning outcome framework; receiving, via the GUI, a selection of a first learning objective of the plurality of learning objectives; and automatically generating, for display on the GUI, at least one learning resource content associated in the database with the first learning resource and the first learning objective.

The method may also include the steps of receiving a selection of the first learning objective; automatically generating for display on the GUI, a plurality of learning sub-objectives; receiving a selection of a learning sub-objective in the plurality of learning sub-objectives; and automatically generating for display on the GUI, a second learning resource content associated in the database with the first learning resource and the first learning sub-objective.

The menu comprising the learning outcome framework selector may further comprise a learning resource table of contents selector, and may automatically display a table of contents corresponding to the first learning resource upon receiving a selection of the learning resource table of contents selector, and visually highlight at least a portion of the table of contents that includes learning resource content that corresponds to a learning objective corresponding to the first learning objective framework.

In still another aspect, the disclosure provides a system comprising: a database storing at least one learning resource, the at least one learning resource divided into a plurality of sections; and a plurality of learning outcome frameworks, each of the learning outcome frameworks comprising a plurality of learning outcomes, the database mapping at least one of the sections of each of the at least one learning resource to a corresponding learning outcome of the at least one learning outcome frameworks; a processor executing instructions within a memory which, when executed, cause the system to: generate a graphical user interface (GUI), including GUI controls for selecting one of the plurality of learning outcome frameworks for comparison to the at least one learning resource; receive, via the GUI controls, a selection of a first learning outcome framework of the plurality of learning outcome frameworks; execute a first database command selecting, from the database, the plurality of learning objectives corresponding to the selected learning outcome framework; automatically generate, for display on the GUI, a table correlating the plurality of learning objectives corresponding to the first learning outcome framework to a plurality of sections of the first learning resource, the table including graphic indicators illustrating a correlation between each of the plurality of the learning objectives and at least a section of the first learning resource.

The graphic indicators may comprise geometric shapes, and a size of the geometric shape may be varied based on the level of correlation between the learning objective and the corresponding section of the learning resource. The graphic indicator may be or include a calculated percentage value of correlating the learning outcome to the corresponding section of the learning resource. The learning resource may corresponds to a text, and the sections may correspond to chapters in the text. The GUI controls for selecting one of the plurality of learning outcome frameworks for comparison to the at least one learning resource may also be visually highlighted to provide an indication of a level of overlap between the learning resource and the learning outcome framework.

The above features and advantages of the present disclosure will be better understood from the following detailed description taken in conjunction with the accompanying drawings.

BRIEF DESCRIPTION OF THE DRAWINGS

FIG. 11 illustrates a non-limiting example user interface for navigating a table of contents for a learning resource and associated learning objectives and outcomes.

FIG. 13 illustrates a non-limiting example user interface for navigating a table of contents for a learning resource and associated learning objectives and outcomes.

DETAILED DESCRIPTION

Figure 1:
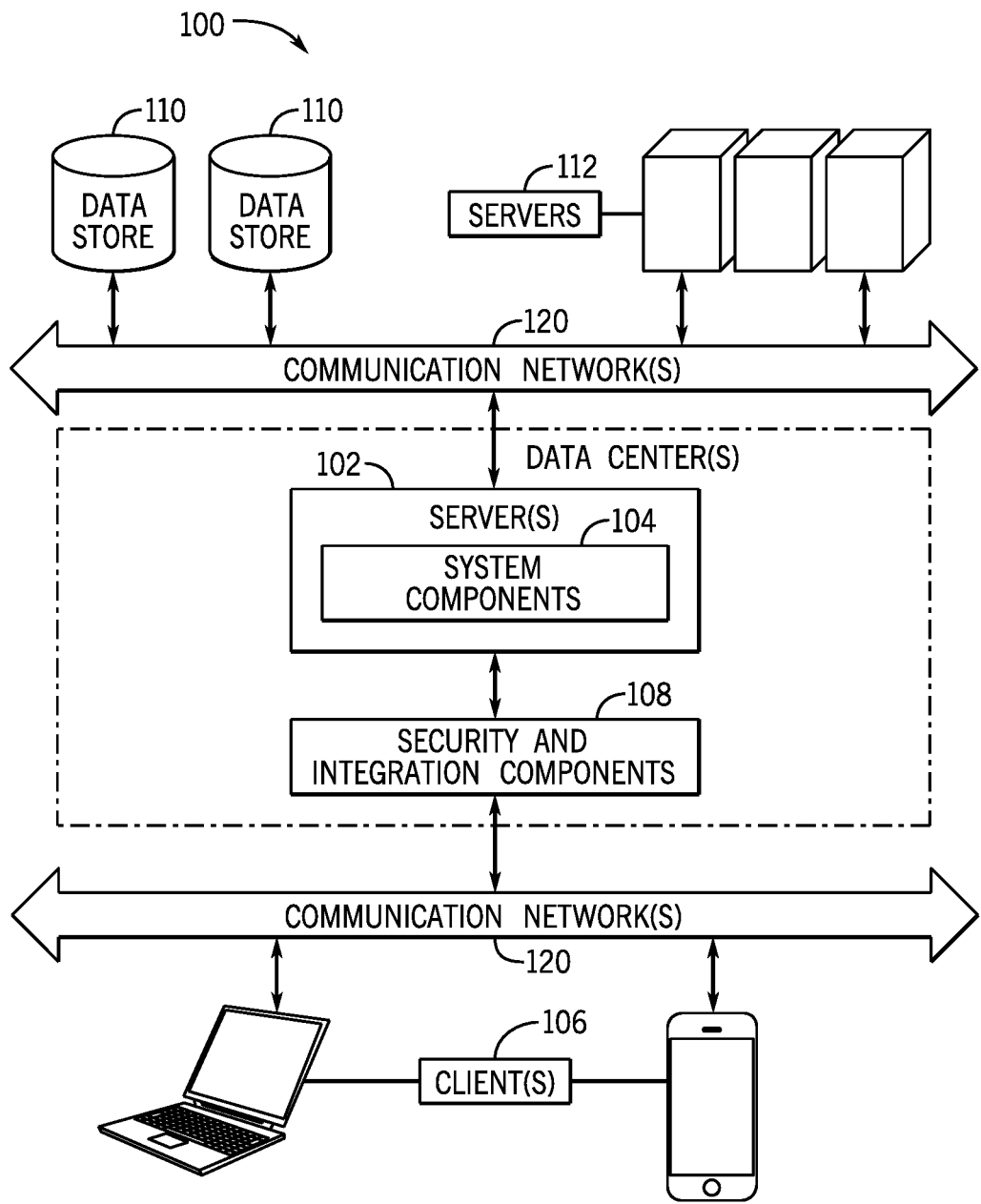
FIG. 1 illustrates a system level block diagram for navigating a table of contents for a learning resource and associated learning objectives and outcomes.

The present disclosure will now be discussed in detail with regard to the attached drawing figures that were briefly described above. In the following description, numerous specific details are set forth illustrating the Applicant's best mode for practicing the disclosure and enabling one of ordinary skill in the art to make and use the disclosure. It will be obvious, however, to one skilled in the art that the present disclosure may be practiced without many of these specific details. In other instances, well-known machines, structures, and method steps have not been described in particular detail in order to avoid unnecessarily obscuring the present disclosure. Unless otherwise indicated, like parts and method steps are referred to with like reference numerals.

Higher education degree programs are often held to certain standards that ensure students graduating a program or taking a course will come away having met specific learning objectives and therefore achieving certain learning outcomes. These may be defined by many sources, including the school itself, the state (for example, learning objectives put in place in order to make sure credits can be transferred to another university within the state), external boards (for example, the American Nurses Association, medical boards, bar associations, etc.), and the like. These standards frequently take the form of a learning outcome framework.

Instructors often use learning resources, such as online materials, textbooks, or other content, to instruct various learners. Currently, when evaluating such a learning resource for adoption into their courses, the instructor, as an evaluator of such learning resources, needs to have an intimate knowledge of one or more learning outcome frameworks in order to determine whether or not a particular learning resource is aligned with the associated learning outcome framework. Even if the evaluator has such knowledge, it would be difficult to specify where concepts and key examples within both the learning resource and the learning outcome framework overlap and align.

Thus, instructors may have access to multiple learning resources (e.g., textbooks, electronic or "e-text" textbooks, additional online or print materials, etc.) and may select various learning resources, possibly via online website content. However, in this environment, many times instructors either are not sure how to use the environment, or they are unsure what titles will best represent the learning requirements for their courses, etc., requiring them to leverage a sales representative or customer services representative to guide them through use of the environment and the content of the materials available within the environment to find the right materials.

To overcome such problems, the disclosed embodiments help instructors/evaluators to evaluate a learning resource in order to determine whether or not a particular learning resource meets the needs of the students, institution, external boards, etc., and to determine if the learning resource includes all concepts, topics, examples, etc. to fulfill the requirements of the associated learning outcome framework. These disclosed embodiments may also be utilized during the course of the class when trying to meet a particular learning outcome requirement/learning objective. Some disclosed embodiments may quickly highlight areas most relevant to that objective for review, emphasize specific concepts, topics examples, inspire quiz questions, etc.

Thus, the disclosed embodiments enable instructors, such as higher education professors or other instructors, to determine which learning resources (e.g., texts) satisfy learning objectives, both at a course level and at a curriculum level, within a learning outcome framework. To accomplish this, the disclosed embodiments include user experience (UX, e.g., graphical user interfaces, or GUI) solutions, and one or more back end algorithms, which allow the instructors to correlates instruction content resources (e.g., tables of contents and their associated content) with mandated learning objectives for associated higher education courses, curriculums, external boards, etc. associated with one or more learning outcome frameworks.

Specifically, the disclosed embodiments may help instructors and/or institutions make more accurate and measured decisions when selecting a learning resource for their course or institution to adopt. In other words, the instructor or institution may use the design of the disclosed embodiments to better inform the instructor or institution, and allow them to sample and determine the best learning resources for their course or institution, going at their own pace to see how the included learning resources do or do not work with the material that they're trying to teach. The disclosed embodiments therefore include screens such as those disclosed herein that give the instructor or institution access to systems that provide such a digital sample experience.

Some use cases may help to better describe and illustrate the disclosed embodiments. In one example use case, an institution may use a selected learning outcome framework, and may need to be able to weight a title on how well it aligns, and therefore may utilize the disclosed embodiments to accomplish this. In another example use case, an instructor may not be intimately familiar with the details of a learning outcome framework, and may utilize the disclosed embodiments to determine such details. In another example use case, an instructor may not have time to read large portions of new titles to decide if they align with their specific learning outcome framework, and may utilize the disclosed embodiments to accomplish this in a more streamlined fashion.

FIG. 1 illustrates a non-limiting example distributed computing environment 100, which includes one or more computer server computing devices 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model or any other distributed computing architecture.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Figure 2:
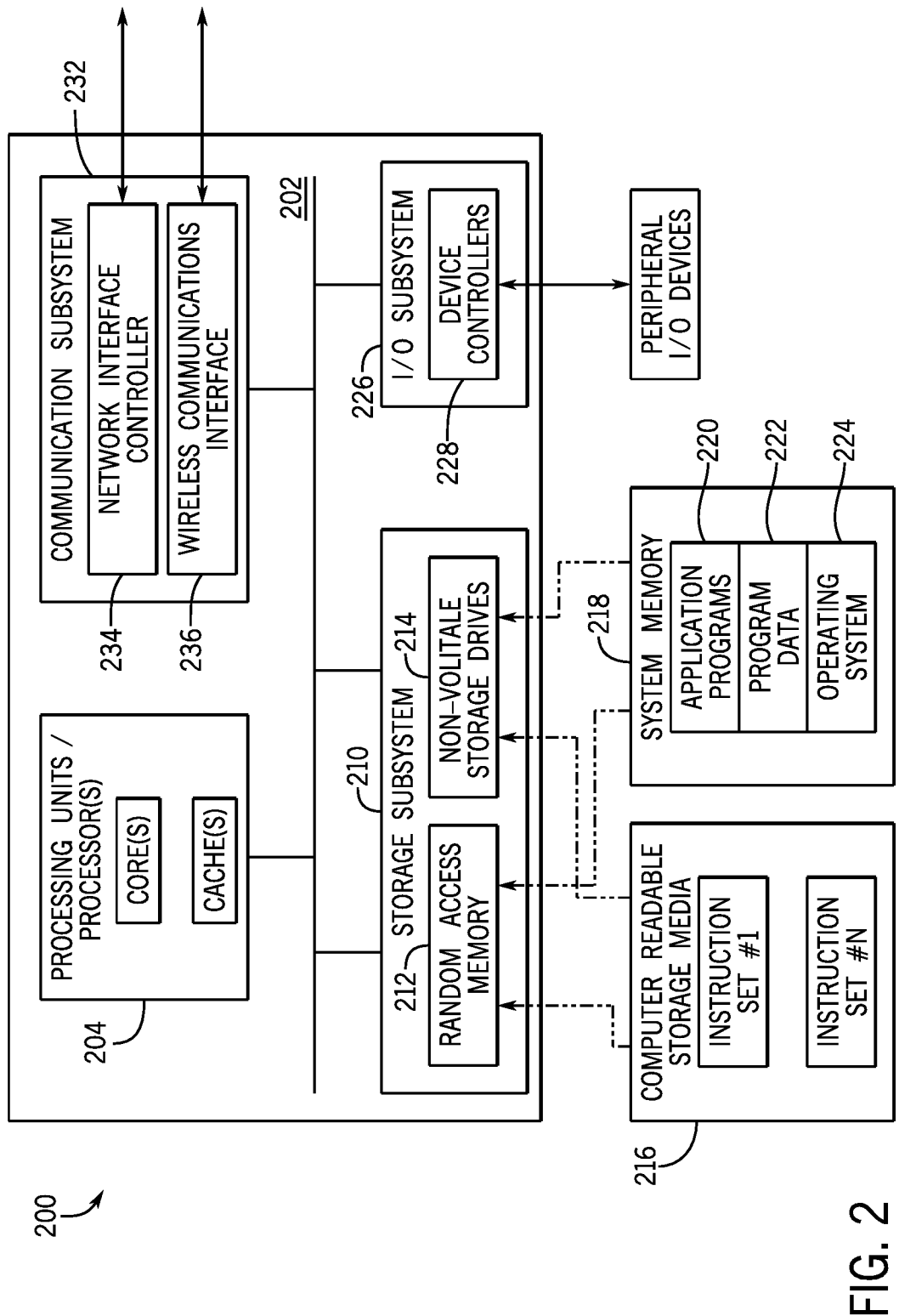
FIG. 2 illustrates a system level block diagram for navigating a table of contents for a learning resource and associated learning objectives and outcomes.

The embodiments shown in FIGS. 1-2 are thus one example of a distributed computing system and is not intended to be limiting. The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users, As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Computing environment 100 also may include one or more data stores 110, possibly including and/or residing on one or more back-end servers 112, operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

With reference now to FIG. 2, a block diagram of an illustrative computer system is shown. The system 200 may correspond to any of the computing devices or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code, and may maintain multiple concurrently executing programs or processes. Processor(s) 204 may also include one or more specialized processors, (e.g., digital signal processors (DSPs), outboard, graphics application-specific, and/or other processors).

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), etc.

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

The various physical components of the communications subsystem 232 may be detachable components coupled to the computer system 200 via a computer network, a FireWire® bus, or the like, and/or may be physically integrated onto a motherboard of the computer system 200. Communications subsystem 232 also may be implemented in whole or in part by software.

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

As noted above, the disclosed embodiments enable instructors, such as higher education professors or other instructors, to determine which learning resources, such as texts, satisfy learning objectives, both at a course level and at a curriculum level, within learning outcome frameworks. To accomplish this, the disclosed embodiments include a user experience (UX, e.g, graphical user interfaces, or GUI) solution, and one or more back end algorithms that allow the instructors to correlate learning resources for instruction content (e.g., tables of contents and their associated content) with mandated learning objectives for learning outcome frameworks for associated higher education courses and/or curriculums.

As a non-limiting example, a user may desire specific outcomes for a course, institution, etc. as required by certain learning objectives, and the instructor or institution may desire to present syllabus and/or content for a course that describes a desired outcome in a way that accommodates outcome requirements for accreditation, certain learning objectives, etc.

A user such as an instructor for a course at an institution may desire a way to navigate through the content or through the desired objectives or sub objectives to those objectives in such a way that they understand the correlation between the learning resource and the learning objectives, and the details associated with that correlation. Using this information, the instructor may then make a much more targeted decision on their learning resource, providing value to the instructor and the institution. As used herein, the term learning resource may include any content used within a course, including textbooks, electronic textbooks, other online resources, or any other resources used in a course or within an institution, etc. Using this information, the instructor or institution may further determine whether or not they want to adopt that learning resource. If they feel like the associated learning objectives do not accommodate the desired objectives or outcome, they may include this determination when weighing whether or not to use the learning resource, or select a different learning resource.

As non-limiting examples, courses and/or curriculums may include: state-mandated learning objectives for individual higher education courses and/or curriculums, or any other external learning outcome frameworks for curriculums. As non-limiting examples, such external learning outcome frameworks may include professional organizations, such as the American Nursing Association, which may require that anyone receiving a degree in nursing is required to know specific concepts and skills. Other examples of such curriculums may include requirements set by a board such as a medical board or a state bar, or curriculum requirements set by a university, set at a state level, allowing credits to transfer between accredited state universities, and the like.

As a preliminary step, the disclosed embodiments may receive user input for the various learning resources to be created and displayed. In some embodiments, this may include importing the data from the learning resources in electronic form, such as by accessing a stored content via an API or the like. In some embodiments, the content of these learning resources, may include scanning the resource and applying optical character recognition (OCR) to import the content from the learning resources.

Once the content has been stored within the disclosed system, the system may further import, or generate, a table of contents, breaking down the learning resource into one or more sections or subsections, and generating or importing a table of contents representing each of the sections and/or subsections. The learning resource content and the tables of contents may then be stored in a database 110.

A next step may include importing the learning outcome frameworks into the disclosed system and storing them in data storage 110. This database may associate the data from the learning resource content, possibly sections or subsections of the content within the table of contents, with the learning objectives in the learning outcome frameworks. In some embodiments, the learning resource content, and the learning objectives may be stored in a single database 110, in some embodiments, they may be stored in separate databases that are communicatively coupled. In this way, the learning objectives and the sections and/or subsections may be correlated and associated within the disclosed system.

In some embodiments, the learning objectives and learning sub-objectives, and sections or subsections respectively, may be automatically correlated when they are received. This may be accomplished by keyword analysis, via machine learning, and the like.

In some embodiments, the correlations between the learning objectives and the sections of the learning resource content may be input into the system by subject matter experts, who may map the sections or subsections, possibly as represented in the table of contents, to learning outcome frameworks and/or learning objectives within associated learning objective frameworks.

Referring now to FIGS. 3-9, a series of exemplary graphical interfaces correlating one or more learning outcome framework to a learning resource and corresponding learning objectives are shown. As illustrated, the learning outcomes associated with a specific learning framework can be graphically displayed along one axis of a tabular format, with sections of a selected learning resource along another axis. Graphical symbols highlighting coverage/correlation between the learning outcomes and the corresponding sections can be provided at intersection points along the axis to visually illustrate the content, where the amount of overlap of content can be shown, for example, by the size and/or color of the graphical symbol, as described more fully below.

In the non-limiting examples seen in FIGS. 3-9, a subject matter expert (SME) may oversee the correlation of course content for a sociology course, and may be presented with a learning resource which correlates within the system with three different learning outcome frameworks: The American Sociological Association, 21st Century Skills, and Introduction to Sociology—Manza. The SME may then provide mappings from these learning outcome frameworks to one or more learning resources.

In some embodiments, this may be accomplished by the SME inputting the data for the learning objectives into a spreadsheet, which cross references each of the learning objectives with each of the sections or subsections within each learning resource, where spreadsheet columns represent each learning objective, and spreadsheet rows represent the sections and subsections of the learning resource content text, with each of the learning outcome frameworks on a different tab. In some embodiments, the SME may access an online system and input, possibly via a GUI on a software, the data for both the learning objectives and the sections or subsections for the learning resource content text, as well as the correlation between the two, which may then be stored within a database 110 as described above.

Using the input data from the SMEs, the system may then be configured to determine, and graphically display to users, the correlation between the sections or subsections and the learning objectives within the learning outcome frameworks. As a non-limiting example, the system may generate a GUI that displays the chapters of a textbook and determine, graphically and/or visually, whether each of the chapters or subsections of the chapters covers one or more learning objectives within a particular learning outcome framework, thereby allowing administrators, instructors, etc. to determine whether to use a particular learning resource within their course or institution.

In some embodiments, such as that seen in FIGS. 3-5, 8 and 12, the disclosed system may use the correlation data described above, and may calculate, based on the mapping of sections and subsections of the learning resource and the learning objectives in each of the learning outcome frameworks, a percentage of learning objectives covered by each learning resource, in order to determine the amount of learning objectives covered by each learning resource, and may display this data to users trying to determine whether or not to use a particular learning resource.

Using this percentage, and the visual displays described below, a user may determine, at a glance, whether a particular learning resource meets, for example, 90% or 100% of the learning objectives within a particular framework. As described below, the user may further see and analyze, for the particular framework element, an alignment of a particular chapter might align with the framework element.

In the embodiments of FIGS. 3-9, graphic symbols 315 illustrating coverage/correlation are represented by one or more circles or dots. In embodiments where the learning objective is not covered by the learning resource, the circle or dot may be "grayed out" or otherwise disabled in some way. In other embodiments, degrees of the coverage may be represented by a circle that is present, filled in, or not filled in. Although circles or dots are illustrated here, various other methods of visually indicating coverage/correlation may also be used, including, by way of example, bold, italic, underlined, or other types of fonts; highlighting using variations in color; using various shapes, such as, for example, square, rectangular, or other types of graphical symbols or icons; and changing the size of a graphical symbol or icon, such as the circle or dot described above. A gauge may also be provided, for example, adjacent to or around the exterior of a graphic symbol. Other examples of visual cues used in the disclosed system may include a user hovering on any one of the different chapters, and the disclosed system displaying, for example, a textbook and the course objective within the framework that align with a particular section of the textbook. In some applications, the circles or dots or similar graphical symbols or icons may be constructed as graphical controls which may, for example, enable a user to access content from the learning source corresponding to the learning objective.

Using the illustrated graphic symbols 315, a user (e.g., instructor) may look at a particular aspect of the selected framework 310 to determine where the alignment occurs, and see at a glance that a particular framework aspect is covered in, for example, chapters 7, 9, and 13. The user may further determine, in this example, that the framework aspect is found throughout the learning resource, but not, for example, in a specific chapter (e.g., chapter 3). The user may then determine that chapter 3 covers something else.

Using these visual cues, the instructor or institution may identify and evaluate learning resources to determine how various learning resources are lacking in specific learning objectives, and possibly identify supplemental material to supplement and cover areas of the framework that are not covered by a particular learning resource.

Figure 3:
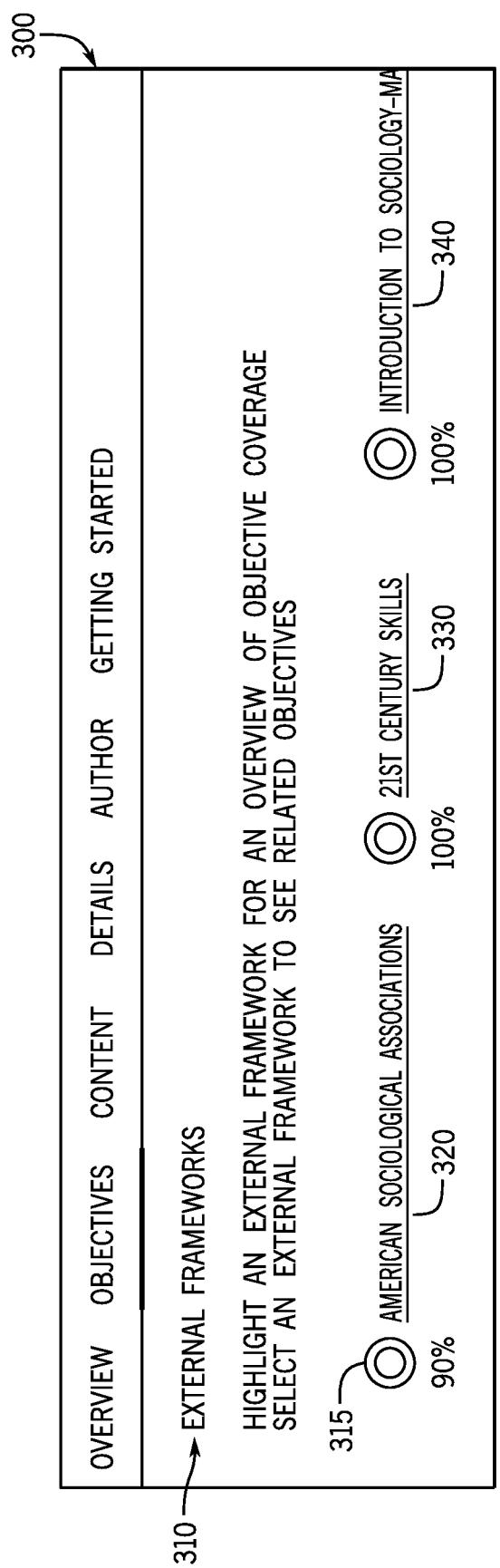
FIG. 3 illustrates a non-limiting example user interface for navigating a table of contents for a learning resource and associated learning objectives and outcomes.

Returning now to the example embodiments in FIG. 3-9, and first particularly to FIG. 3, the disclosed system may present a menu to select a particular sociology learning resource which, as previously noted, can be associated in the disclosed system with one or more frameworks 310. In this non-limiting example embodiment, a user may highlight an external framework for an example overview of learning objective coverage, as seen in FIGS. 4-9.

Referring still to FIG. 3, a user may select an external framework from the presented frameworks 310 to see related learning objectives. Here, three different frameworks (The American Sociological Association 320, 21st Century Skills—a technical skills general framework that may apply to many different subjects 330, and Introduction to Sociology—Manza—a particular framework for introduction to sociology courses 340), which could potentially align to one or more learning resources, are shown. The learning frameworks 310 can each correspond to a graphical symbol 315 which can provide a visual analysis of overlap to a selected learning resource. A numerical percentage of overlap 325 between the resource and the selected framework may be also be illustrated adjacent the graphical symbol 315, as shown. The graphical symbols 315 can also be GUI controls which enable a user to select a specific framework for a more detailed comparison. Alternatively, the frameworks 320, 330, and 340 can be hyperlinks. In the disclosed system, the system may select specific elements to visually demonstrate whether or not a particular external framework aspect is covered within a particular resource section or cell, as described more fully below.

Figure 4:
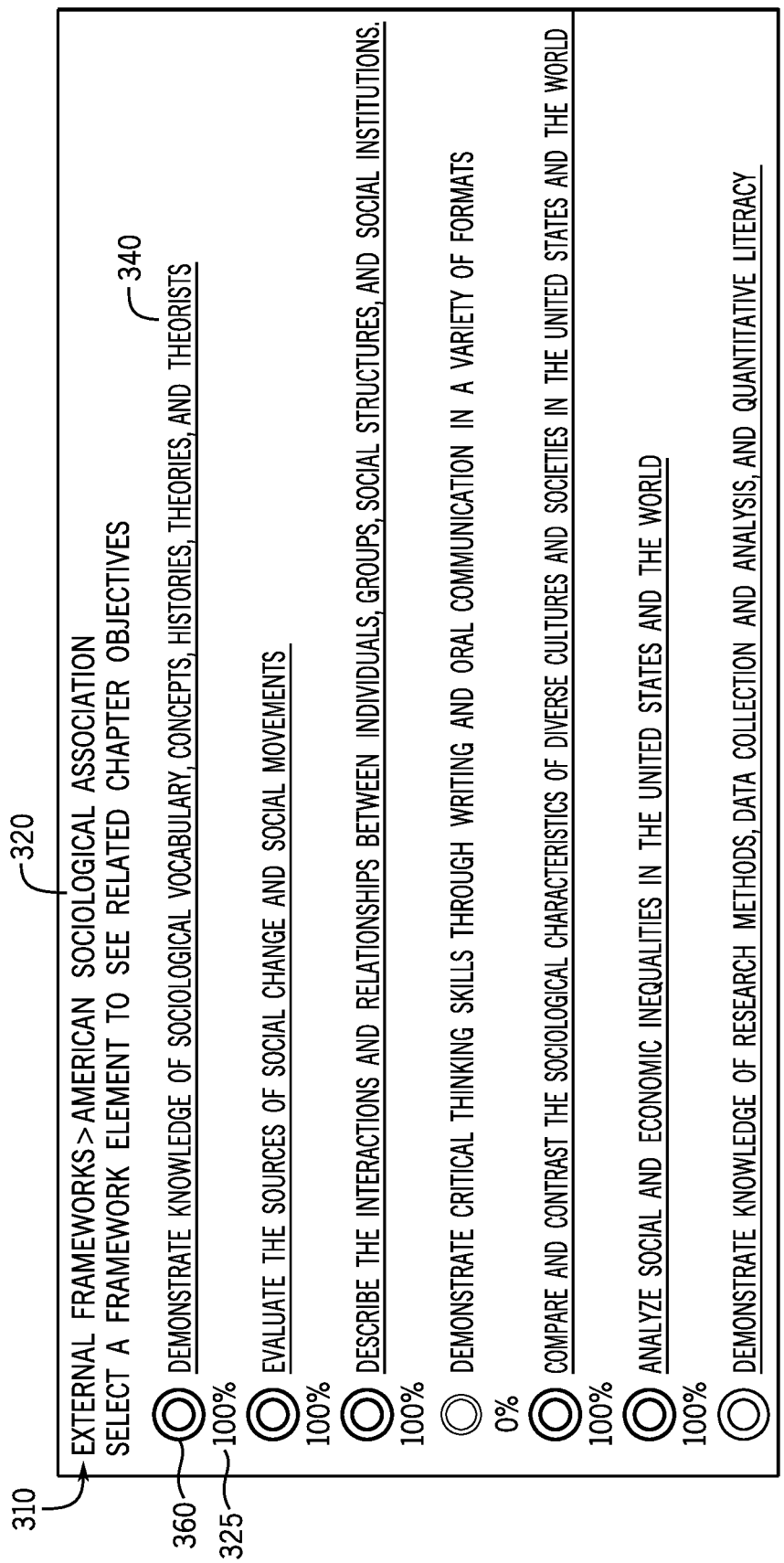
FIG. 4 illustrates a non-limiting example user interface for navigating a table of contents for a learning resource and associated learning objectives and outcomes.
Figure 5:
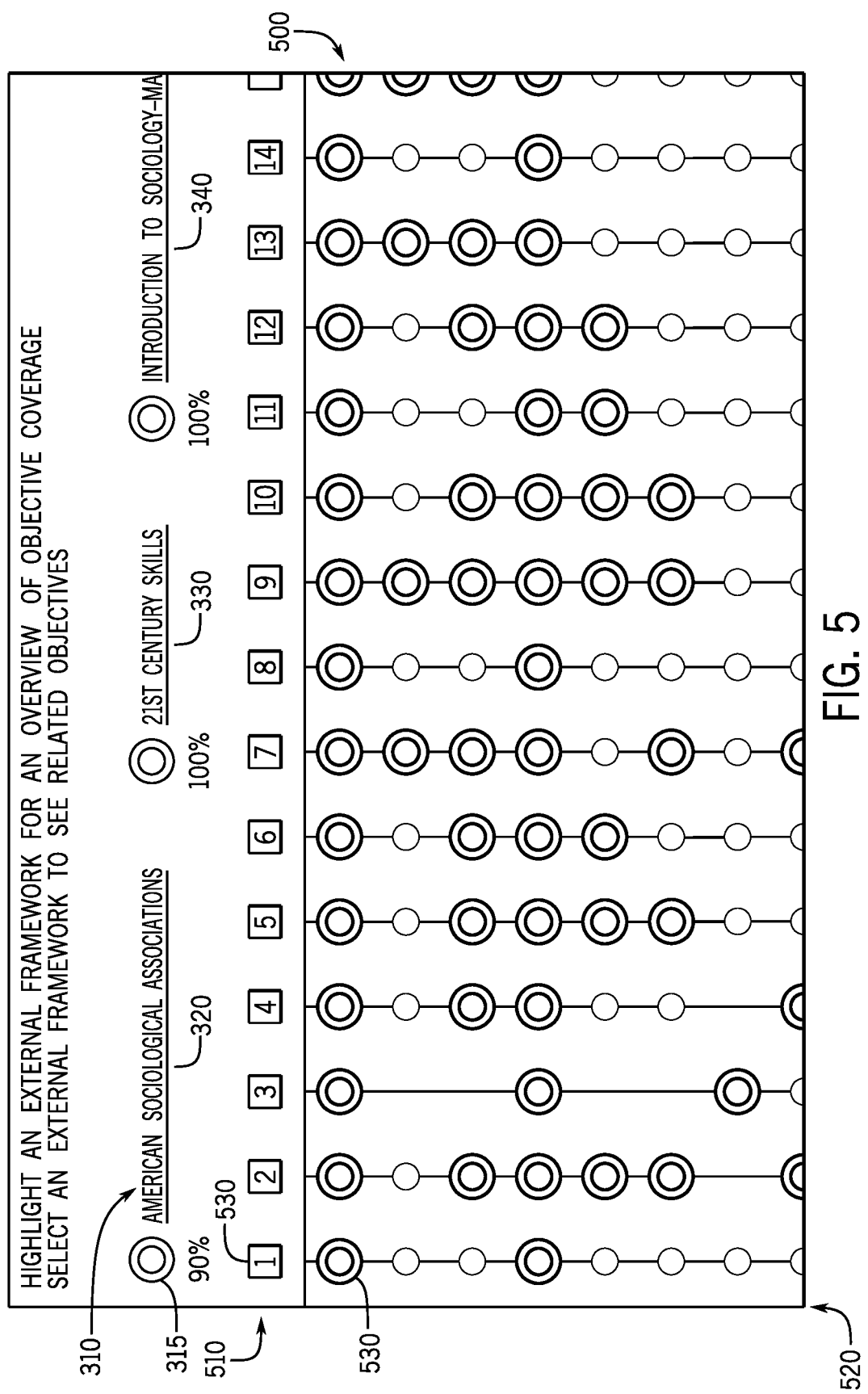
FIG. 5 illustrates a non-limiting example user interface for navigating a table of contents for a learning resource and associated learning objectives and outcomes.

FIGS. 4 and 5, described above, demonstrate the framework for the American Sociological Association. In this embodiment, a user may select a framework element 350 (FIG. 4), and see related chapters and chapter objectives (FIG. 5), thereby allowing an instructor to know how to evaluate the sources of social change and social movement.

Referring now to FIG. 4, a GUI is illustrated for the American Sociological Association 320 framework. Here, the GUI provides a list of framework elements or learning objectives 350, and corresponding graphical symbols 315 which can provide a visual representation of the amount of coverage that the learning resource provides for each of the corresponding framework elements or learning objectives. The graphical symbols 315 can, again, be GUI controls to enable the user to select a specific framework element and correspondence with related chapters or other sections in the learning resource. The framework elements can also be hyperlinks to enable similar types of access.

Referring now to FIG. 5, another GUI is shown. Here, the user can select a framework 310 by accessing a graphical symbol 315 or hyperlink, as described above. After a framework is selected, a table 500 can be illustrated. Here, sections 520, such as chapters, of a learning resource are provided along a first axis of the table 510. Framework elements or learning objectives can be provided along a second axis 520 of the table. Graphical symbols 315 can be provided at intersection points and, again, highlighted in order to illustrate coverage/correlation between the learning resource and the learning objectives. In some embodiments, the graphical symbols 315 may be GUI controls which enable direct access to underlying content in the learning resource.

Figure 6:
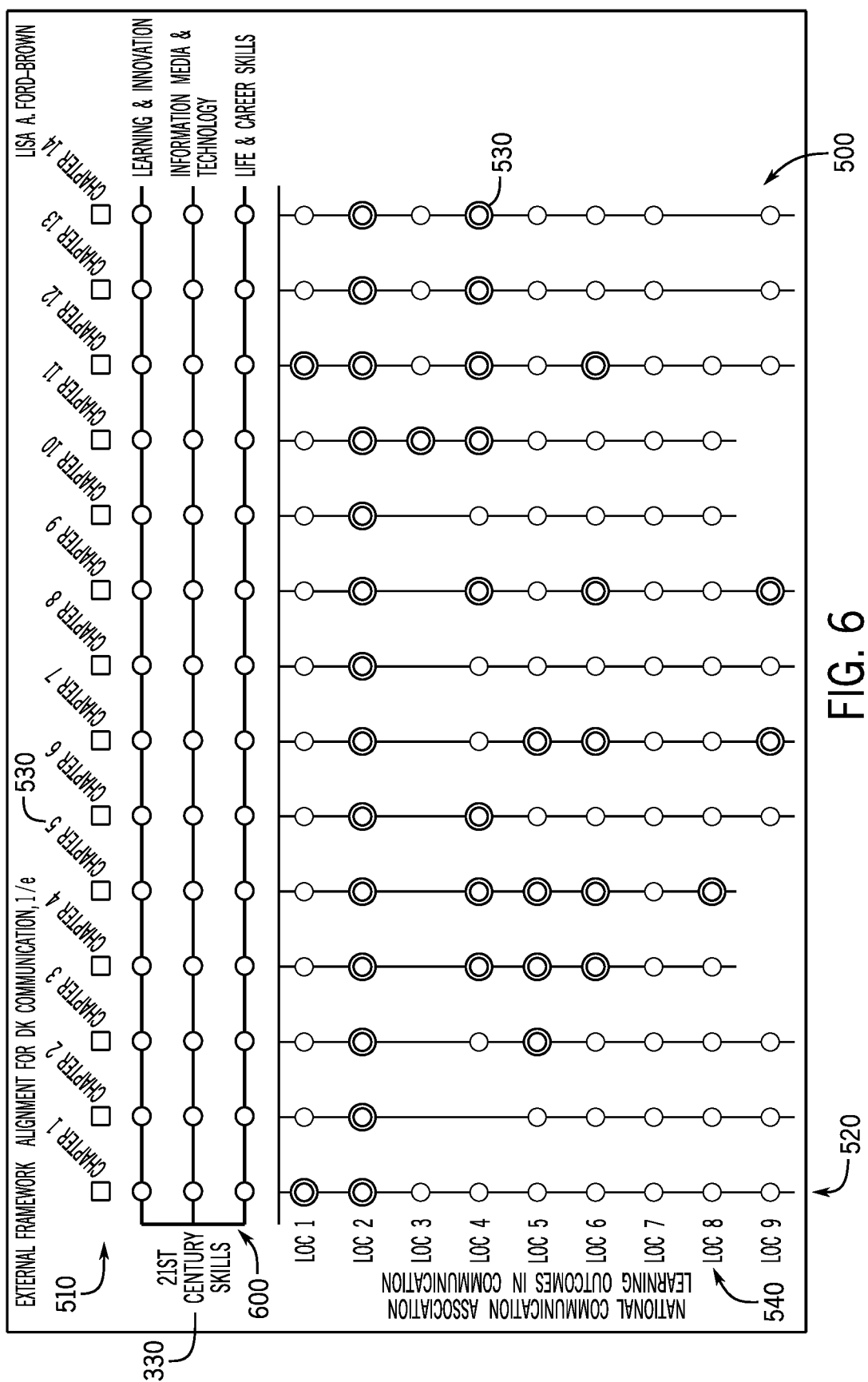
FIG. 6 illustrates a non-limiting example user interface for navigating a table of contents for a learning resource and associated learning objectives and outcomes.
Figure 7:
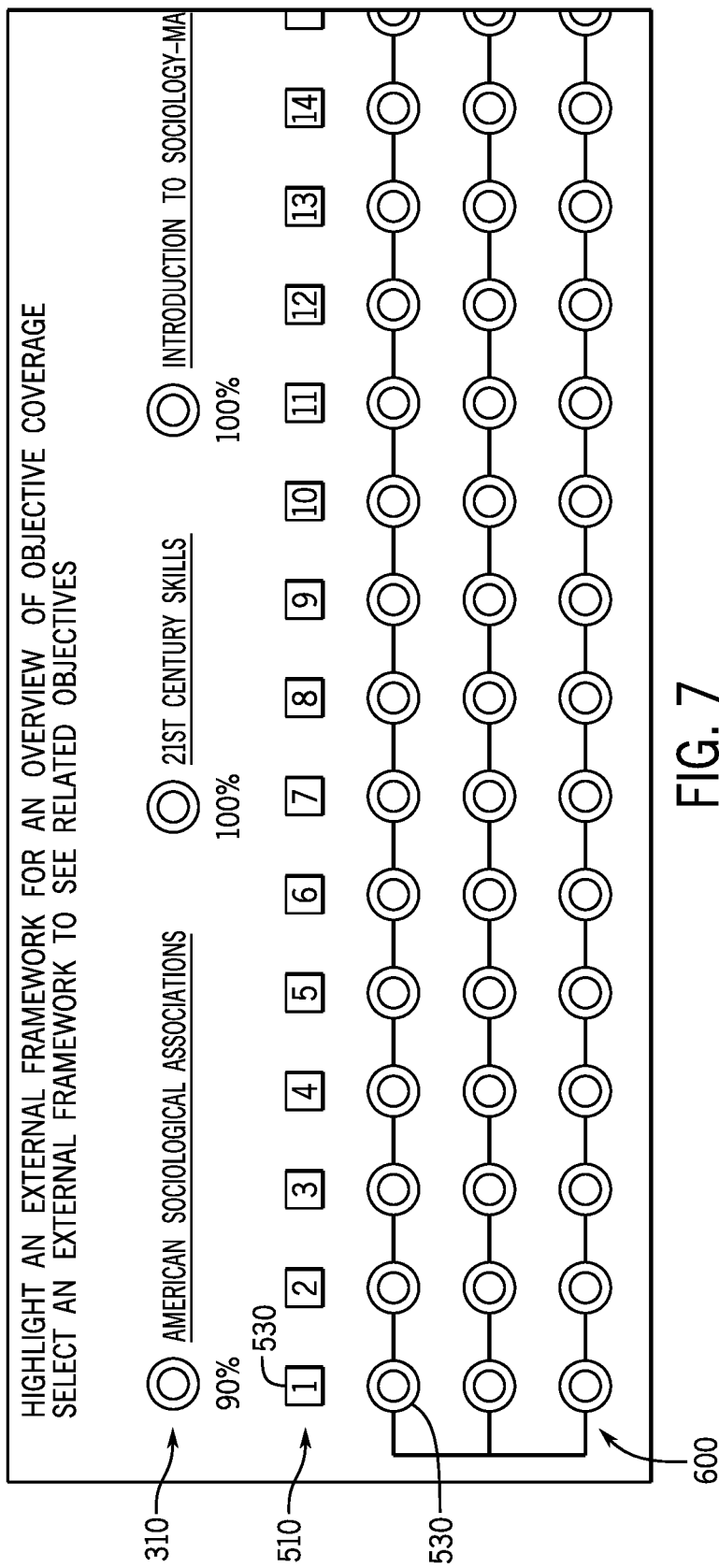
FIG. 7 illustrates a non-limiting example user interface for navigating a table of contents for a learning resource and associated learning objectives and outcomes.

Referring now to FIGS. 6 and 7, a GUI illustrating the framework for the 21st Century Skills 330. Again, chapters 530 of a learning resource can be provided along a first axis 510 of a table 500. Learning objectives may be listed along a second axis 520. Graphical symbols 315 may be provided where the chapters 530 intersect with specific learning objectives 540. Here, the learning objectives 540 are from the National Communication Association. A second table 600 (FIGS. 6 and 7) provides specific objectives corresponding to the 21st Century Skills 330. Tables 500 and 600 may also, for example, illustrate learning objectives and sub-objectives, respectively. In this embodiment, a user may see a correlation between chapters within a learning resource and more than one learning objective and/or outcomes.

Figure 8:
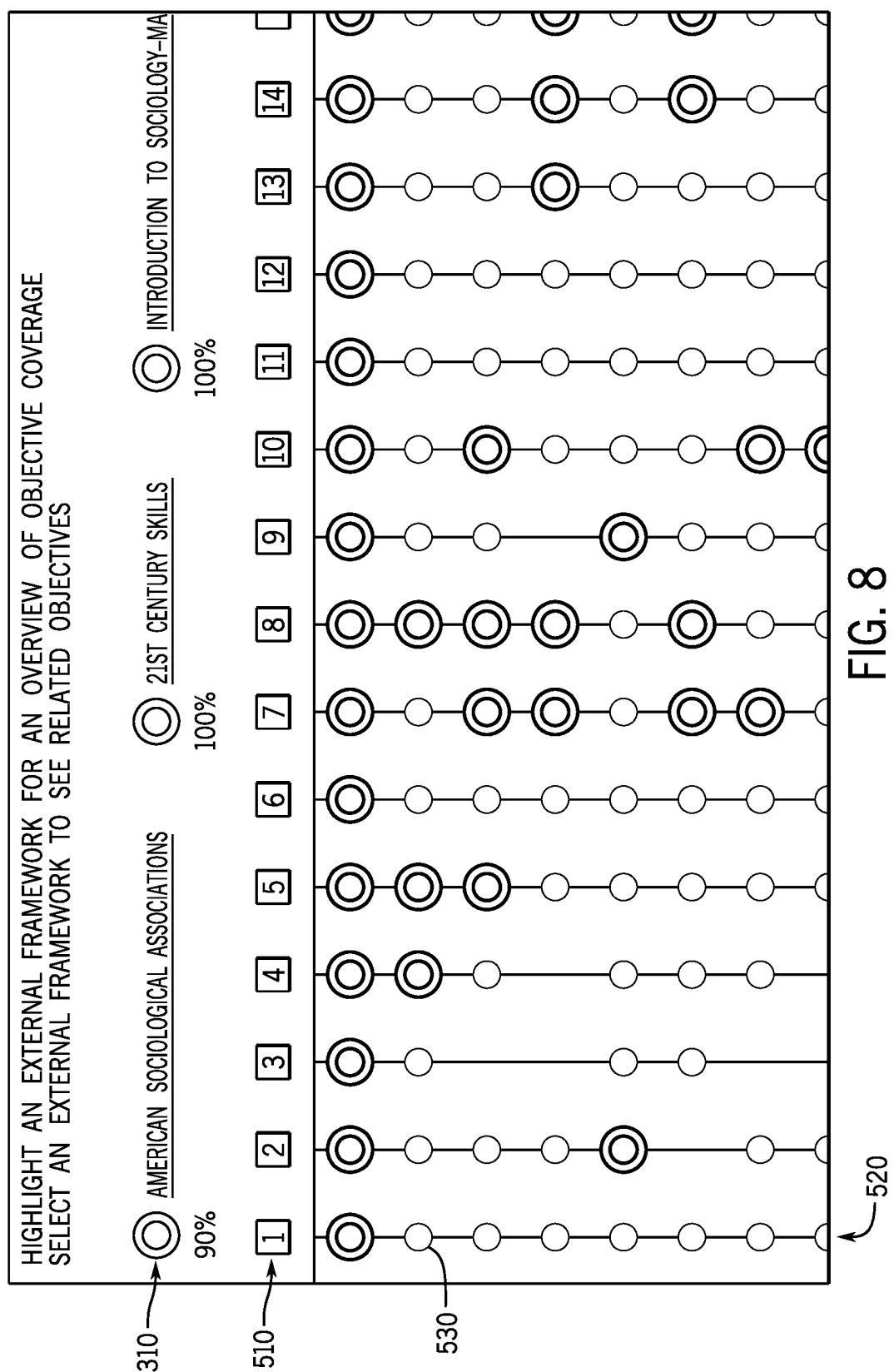
FIG. 8 illustrates a non-limiting example user interface for navigating a table of contents for a learning resource and associated learning objectives and outcomes.

FIG. 8 illustrates a tabular format similar to that described above with reference to FIG. 5. Here, specifically the framework selected is framework 340, the Introduction to Sociology—Manza framework. In this embodiment, a user may again see a correlation between chapters within a learning resource and learning objectives and/or outcomes in a tabular format 500, where the chapters 530 of a learning resource are provided along a first axis 520 and learning outcomes can be provided along a second axis 520.

Figure 9:
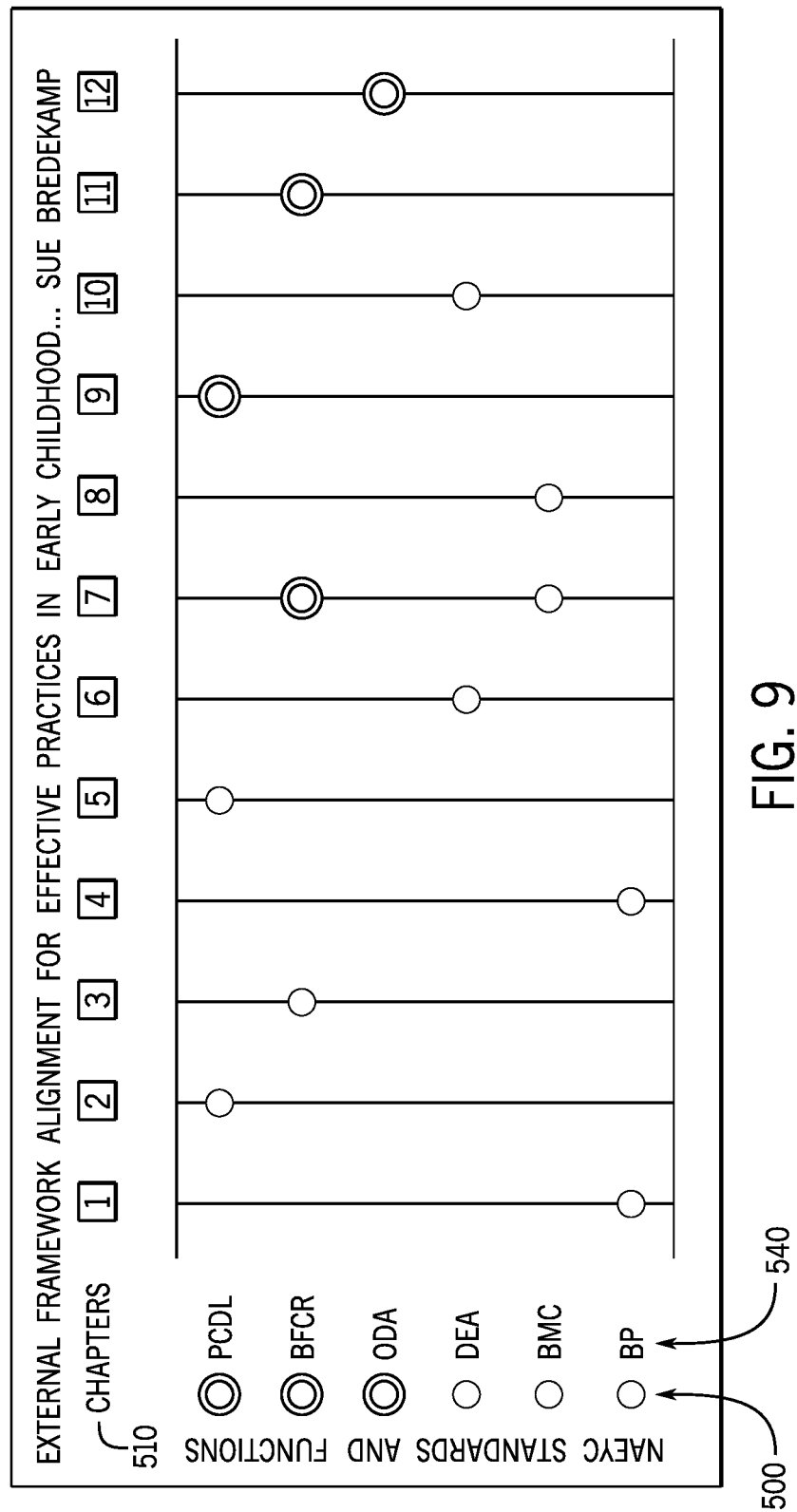
FIG. 9 illustrates a non-limiting example user interface for navigating a table of contents for a learning resource and associated learning objectives and outcomes.

FIG. 9 demonstrates an external framework, specifically a framework for an early childhood education framework. Here, again, an axis 510 for chapters or other sections 530 of a learning resource are illustrated along one axis. Learning objectives are provided along a second axis 520. As illustrated here, an additional column 900 can be provided along axis 520 to illustrate a series of graphical symbols 315 which provide a composite coverage/correlation for each learning objective in the framework. Again, in this embodiment, a user may see a correlation between chapters within a learning resource and learning objectives and/or outcomes.

FIGS. 10-23 demonstrate an alternative GUI in which the user may view correlations between learning resources and learning objectives, learning sub-objectives, and/or learning outcome frameworks. As above, and as demonstrated in FIG. 10-23, these embodiments provide an at-a-glance view for a user to determine whether or not a particular learning resource (e.g., textbook) is aligned with the learning objectives of a learning outcome framework, when considering purchasing or adopting a learning resource or other resource.

Figure 10:
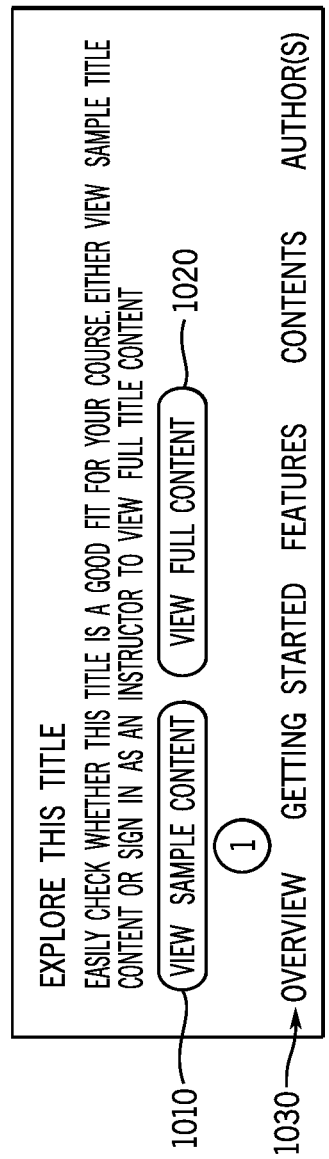
FIG. 10 illustrates a non-limiting example user interface for navigating a table of contents for a learning resource and associated learning objectives and outcomes.
Figure 11:
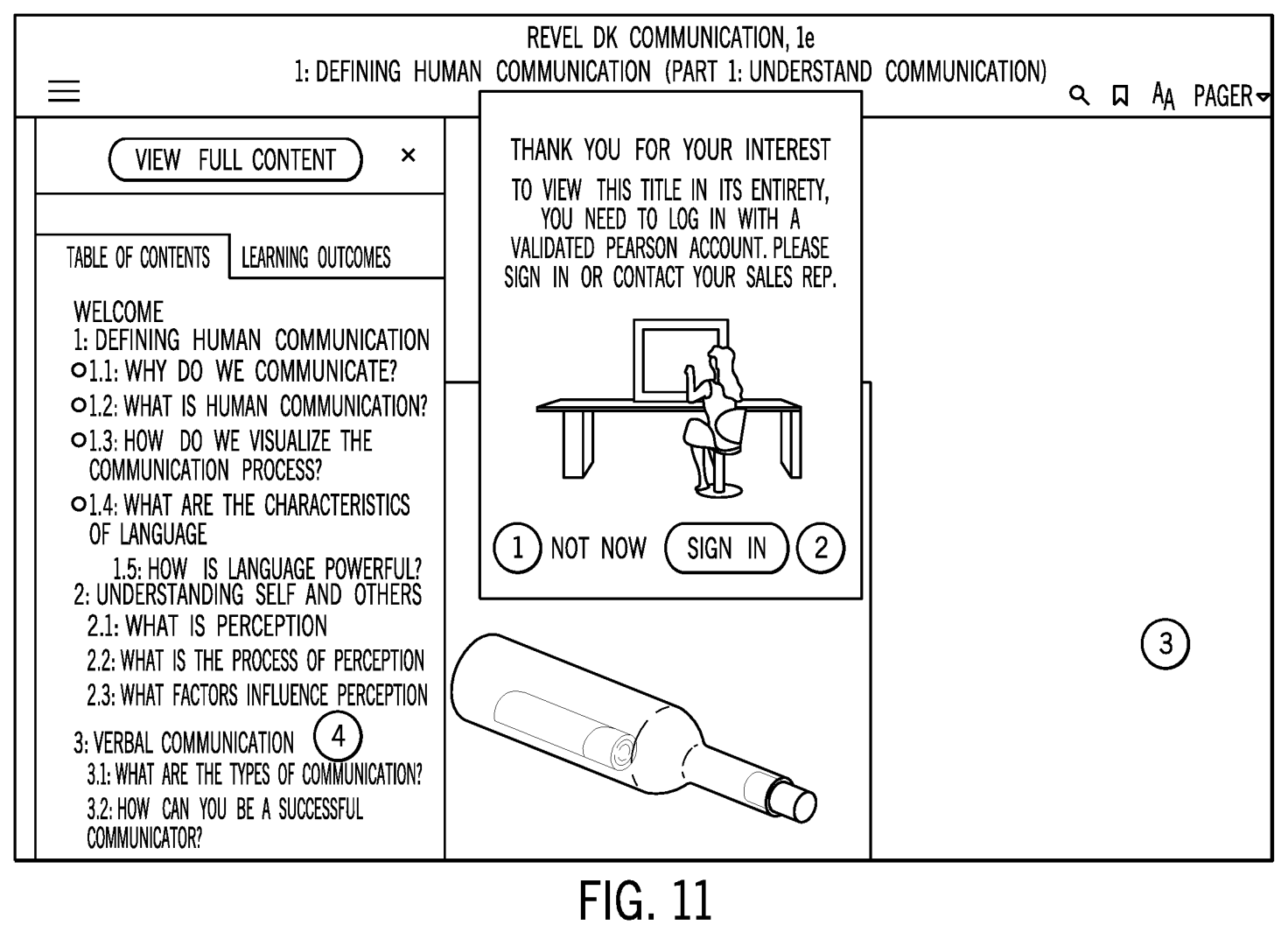

In some embodiments, a user can initially select a learning resource for review from a menu. Referring now to FIG. 10, a menu corresponding to a specific selected learning resource 1000 is shown. The menu for learning resource 1000 provides graphical controls, including a sample content graphical control 1010 which enables a user to access sample content corresponding to the learning resource, and a full content graphical control 1012, which enables a user to access the full content of the selected learning resource. Information graphical controls 1030 allow a user to access an overview, a getting started feature, features, a table of contents, and information about the author. Referring now to FIG. 11, to access the system software, which may be provided on a standalone system or accessed online, a GUI interface may be provided to the user to enable the user to be authenticated to the system. The user may, for example, be authenticated through the interface of FIG. 11 to access the menu of FIG. 10.

After authentication, the disclosed system may access the database 110, and select the data associated with the selected learning resource, as well as any data associated in the database 110 with the selected learning resource, such as the learning objectives and sub-objectives within learning outcome frameworks linked in the database 110 with the selected learning resource. Data logic in the software may then map the associated learning objectives or sub-objectives within the associated framework to the selected learning resource.

Figure 12:
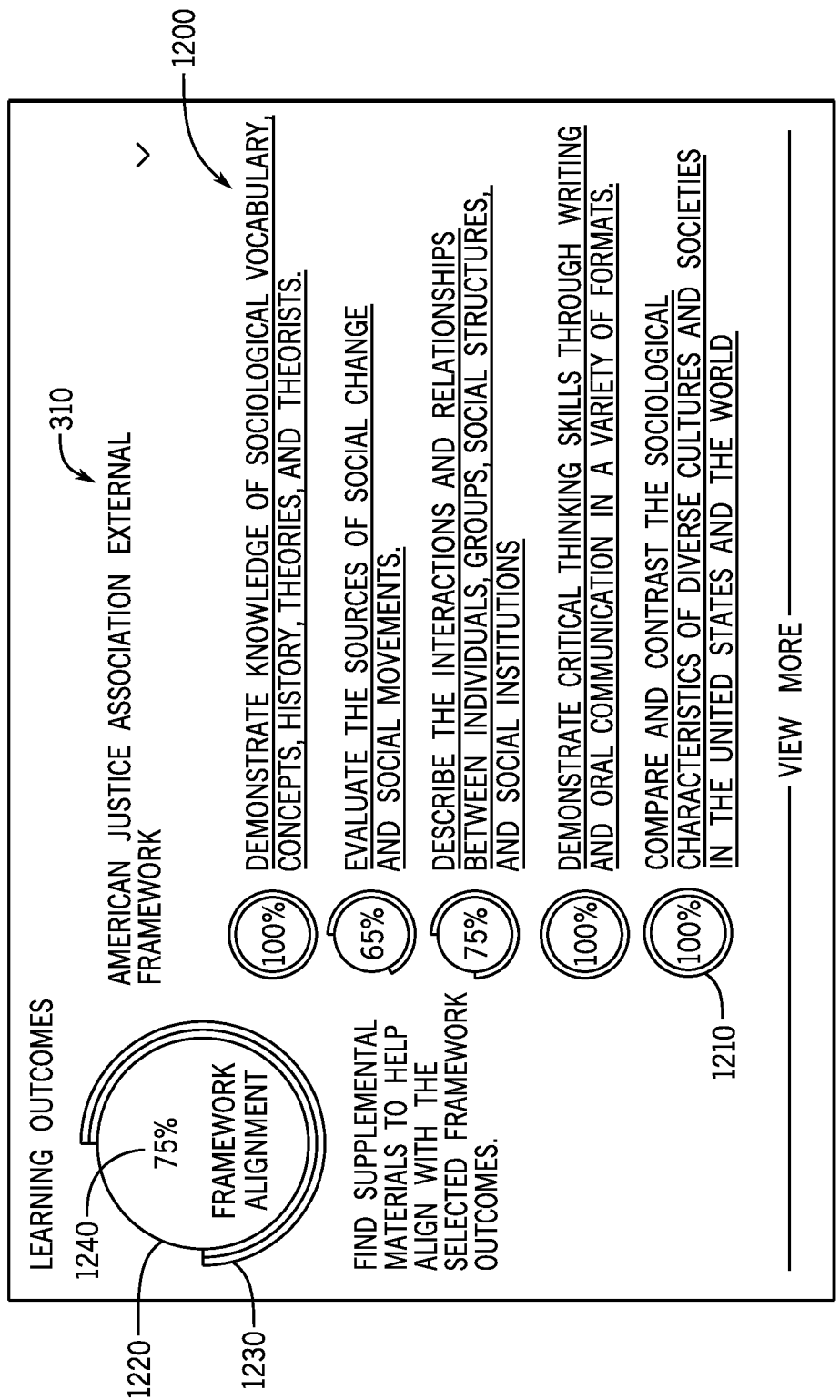
FIG. 12 illustrates a non-limiting example user interface for navigating a table of contents for a learning resource and associated learning objectives and outcomes.

FIG. 12 demonstrates a GUI that illustrates an example framework 310 (The American Justice Association External Framework), and the learning objectives 1200 included within the framework 310, as well as a graphical symbol 1220 illustrating the overall coverage of learning objectives within the selected learning resource (seen in FIG. 13). Here, the graphical symbol is circular in shape. The overlap of coverage between the learning resource and the selected framework here is illustrated by a coverage value line 1230 circumventing at least a portion of the circumference of the circular graphical symbol 1220, and be a numerical percentage value 1240 provided within the circular graphical symbol 1220.

FIG. 13 demonstrates a table of contents 1300 for the learning resource, wherein corresponding chapters 1310, 1320, 1330, and 1340 of the learning resource are highlighted to emphasize the chapters that include content associated with the learning objectives for the selected framework 310. Thus, FIGS. 12 and 13 demonstrate a mapping of the learning objectives 1200 within a framework 310 to the corresponding learning resource 1000.

In some embodiments, such as those seen in FIGS. 14-23, a GUI within the UX may include design features, such as a table of contents widget 1400, including one or more tabs 1410, 1420 as seen in FIGS. 14-22. These tabs may include a table of contents tab 1410, as seen in FIGS. 14-22, which allows the user to access a table of contents for the learning resource (e.g., a textbook) to be analyzed. A second tab, a learning outcomes tab 1420, as seen in FIGS. 14-22 may include a learner outcomes oriented view, allowing the user to navigate a learning resource while showing exactly which parts of the content (e.g., table of contents) align with specific learning objectives or sub-objectives within the learning outcome framework.

The illustrated widget works similarly to a digital table of contents navigator, as described above, in that it maps the learning outcomes 1200 associated with the selected framework 310 to the learning resource 1000. As the user selects a learning outcome framework 310, the navigation may expand to show subordinate learning objectives. Clicking on the subordinate learning objectives may enable the user to navigate through the learning resource and highlight the sections that support a particular outcome. This enables the user to read areas correlating to specific content and to make a judgment call for their specific needs. Thus, a user can use the tool to navigate to key areas in the learning resource.

Figure 14:
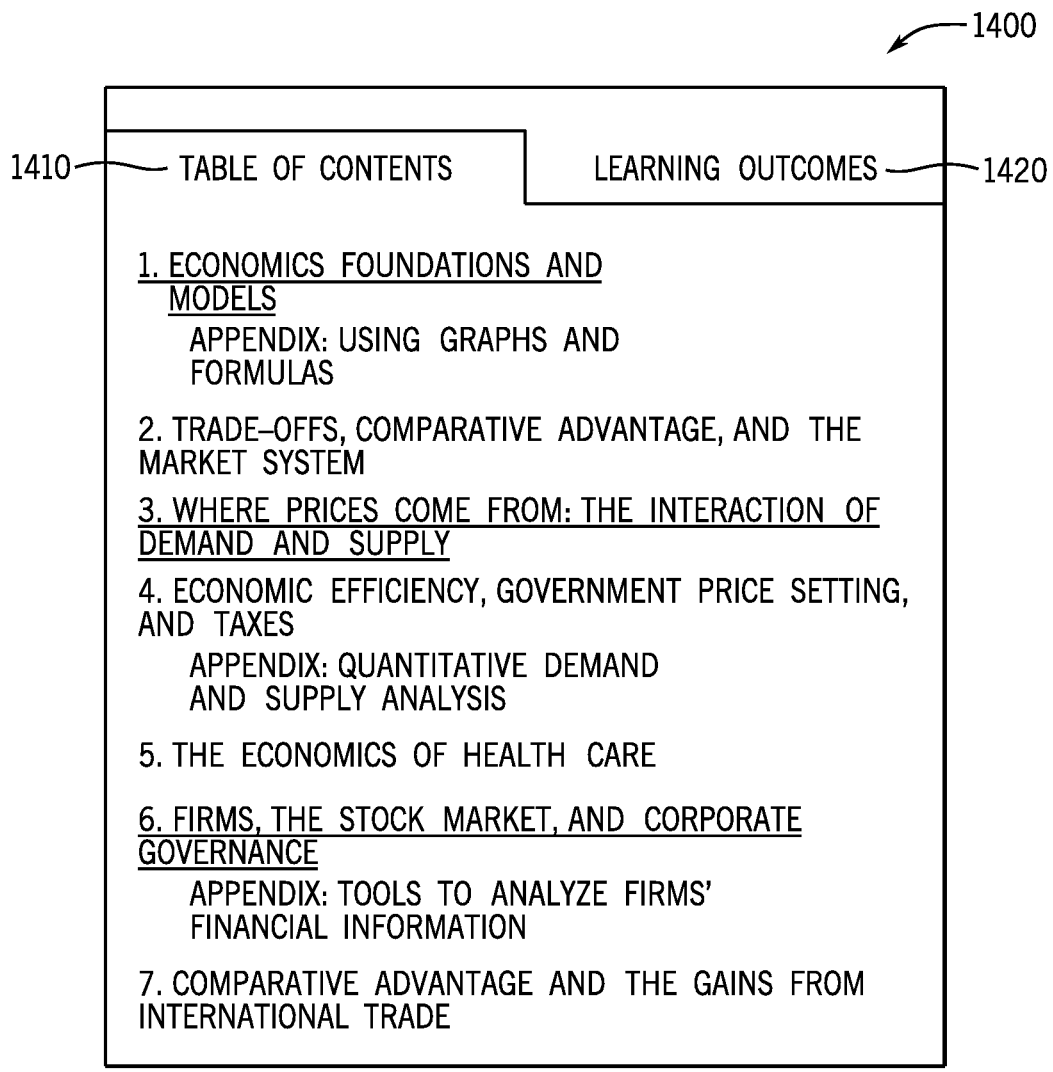
FIG. 14 illustrates a non-limiting example user interface for navigating a table of contents for a learning resource and associated learning objectives and outcomes.

Thus, the disclosed system may generate a table of contents tab 1410 on a GUI, such as that seen in FIGS. 14-22, and display the table of contents for the learning resources to a user. In FIG. 14, the table of contents tab displays all sections (chapters) 1430 and may also illustrate subsections (e.g., sections within a chapter) within the learning resource. Sections 1430 that contain overlap with the selected framework and specific objectives within the framework may be highlighted, as shown. The highlighting may be selected to differentiate sections with higher overlap from those with a lower amount of overlap using variations in font, color, shape, etc.

The system may further generate a learning outcome tab 1420 within the table of contents/learning outcome widget 1400, such as that seen in FIGS. 14-22, and may display this tab for selection within the widget 1400.

Figure 15:
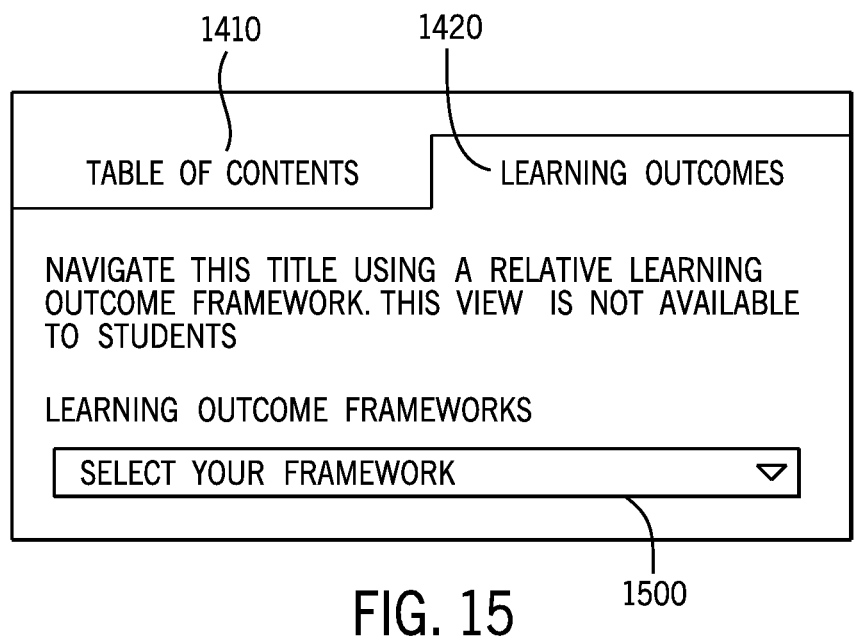
FIG. 15 illustrates a non-limiting example user interface for navigating a table of contents for a learning resource and associated learning objectives and outcomes.

A user may then select the tab from within the widget to display the options demonstrated in FIGS. 15-22. Specifically, as seen in FIG. 15, the system may generate and display on the widget 1400, a learning outcome tab 1420, which may be selected by the user, and may include all of the functionality described in relation to FIGS. 14-23. For example, after selecting the learning outcome tab 1420, the user may be presented with a dropdown menu 1500, as seen in FIG. 15, from which to select a framework from a plurality of frameworks populated by the disclosed system, as stored, for example, in database 110.

Figure 16:
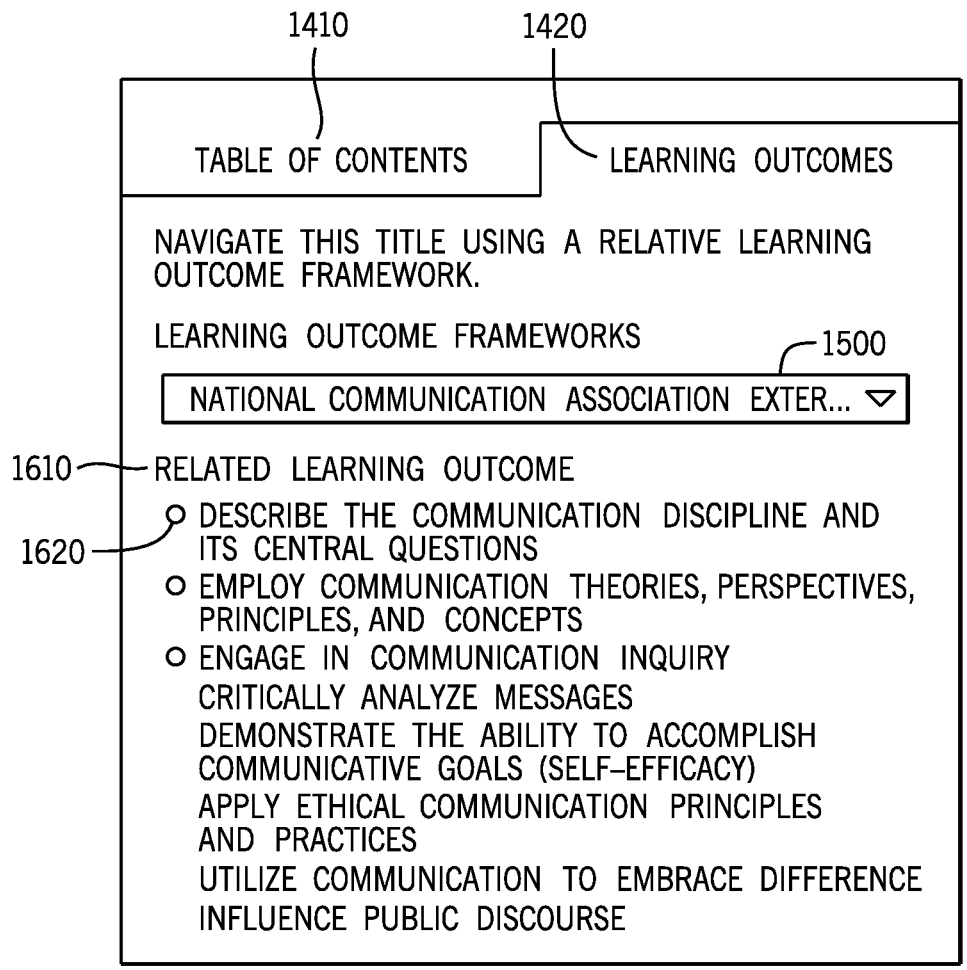
FIG. 16 illustrates a non-limiting example user interface for navigating a table of contents for a learning resource and associated learning objectives and outcomes.

As seen in FIGS. 15 and 16, in response to the user's selection of a learning outcome framework from dropdown menu 1500, the disclosed system may identify related learning objectives 1610 (i.e., those learning objectives that are common in the database 110 to the selected learning resource and the learning outcome framework selected), and display the related learning objectives to the user 1610, with GUI components 1620 for selecting the related learning objectives 1610.

Figure 17:
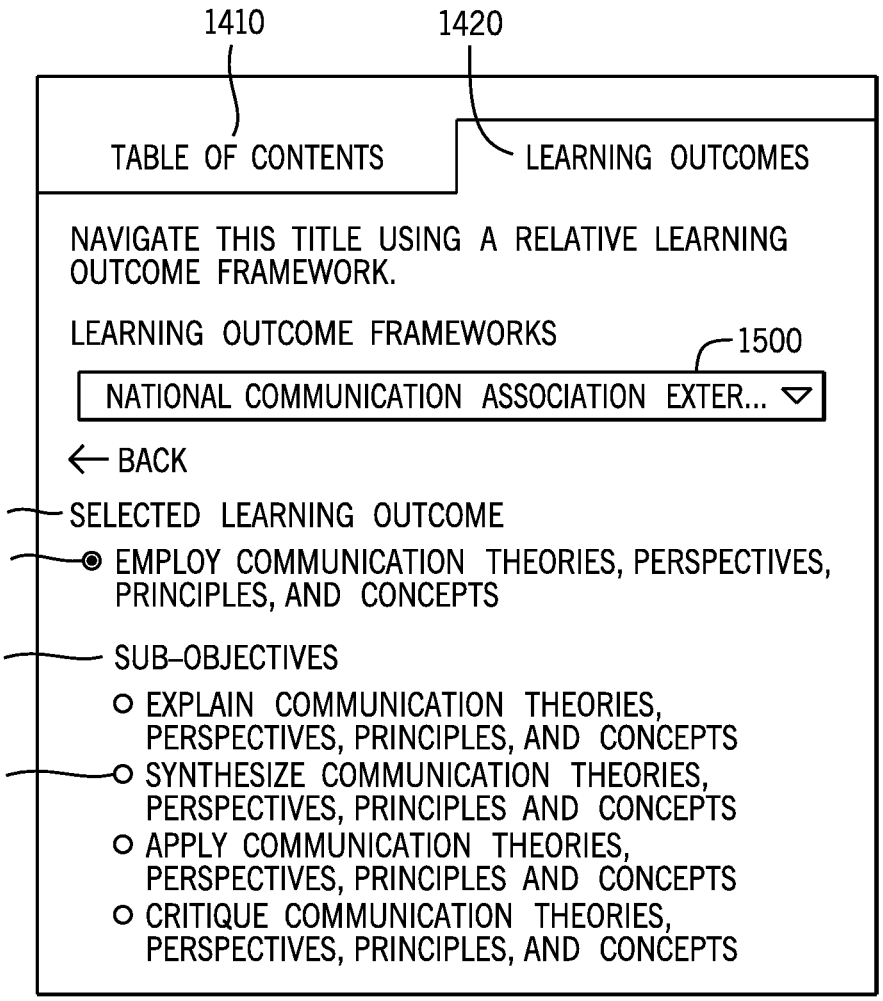
FIG. 17 illustrates a non-limiting example user interface for navigating a table of contents for a learning resource and associated learning objectives and outcomes.

As seen in FIG. 17, in response to selecting a learning objective 1610, the disclosed system may select all sub-objectives 1710 associated with the selected learning objective, and display the sub-objectives 1710 for the selected learning objective 1610 within the learning outcomes tab 1420 of the widget 1400. The sub-objectives 1710 can each be displayed in association with a GUI control component, sub-objective selection component 1720, for selecting the sub-objectives 1710.

Figure 18:
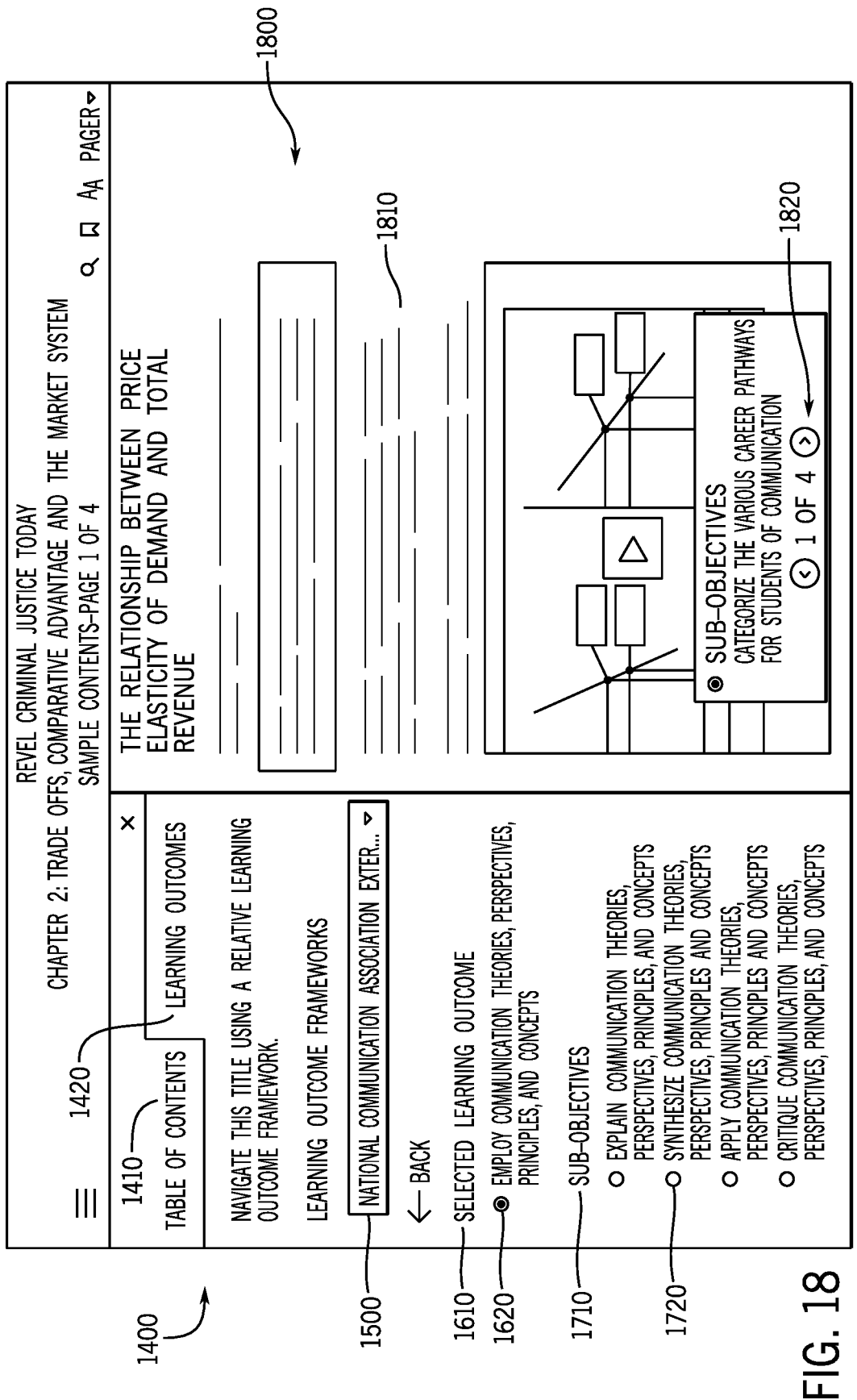
FIG. 18 illustrates a non-limiting example user interface for navigating a table of contents for a learning resource and associated learning objectives and outcomes.

As seen in FIG. 18, in response to selecting a sub-objective 1710, the disclosed system may select a content 1810 associated with the sub-objective 1710 from, for example, database 110, and display the associated content 1810 in a content area 1800 of the display. Thus, if the user clicks on any of the sub-objectives 1710, the disclosed system may take the user to a corresponding page in the learning resource and show the user the content that addresses the selected sub-objectives 1710. In some embodiments, the system may select a content 1810 associated with the selected learning outcome 1610 and allow the user to browse the associated content.

As seen in FIG. 18, if there is more than one content associated with the learning outcome 1610 or the sub-objective 1710, the disclosed system may generate and display a GUI element 1820 allowing the user to page through each of the contents associated with the learning outcome 1710 and/or sub-objective 1610.

Figure 19:
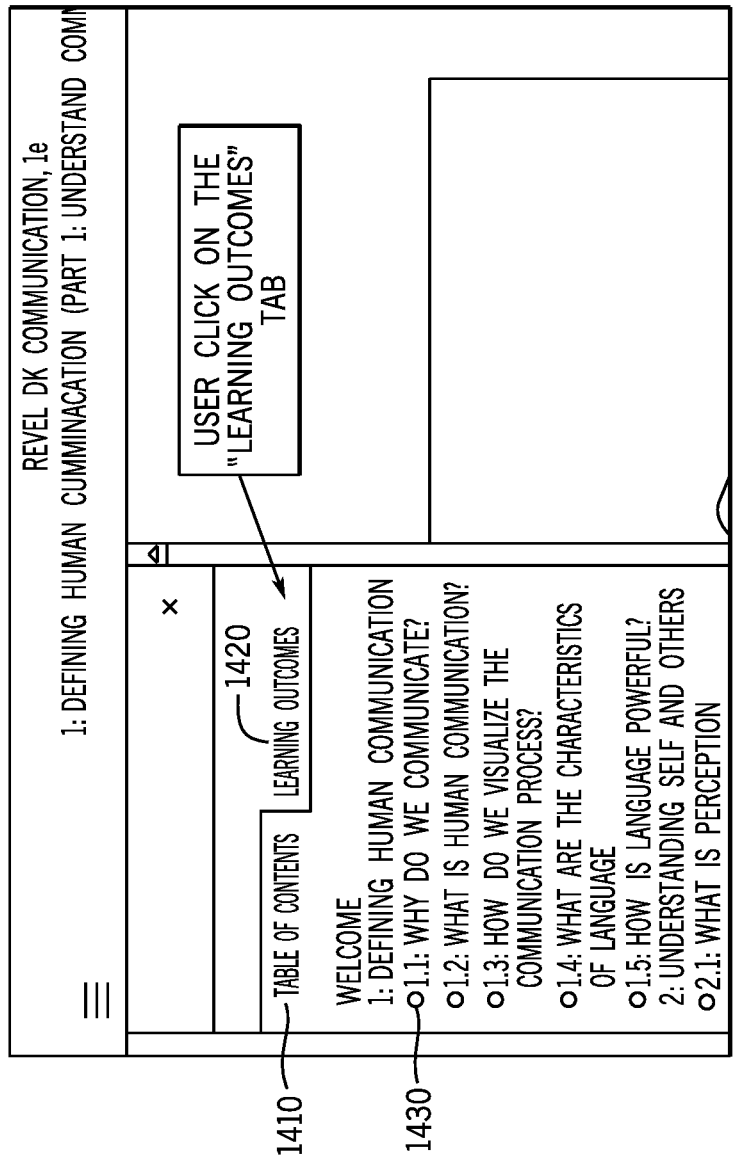
FIG. 19 illustrates a non-limiting example user interface for navigating a table of contents for a learning resource and associated learning objectives and outcomes.
Figure 20:
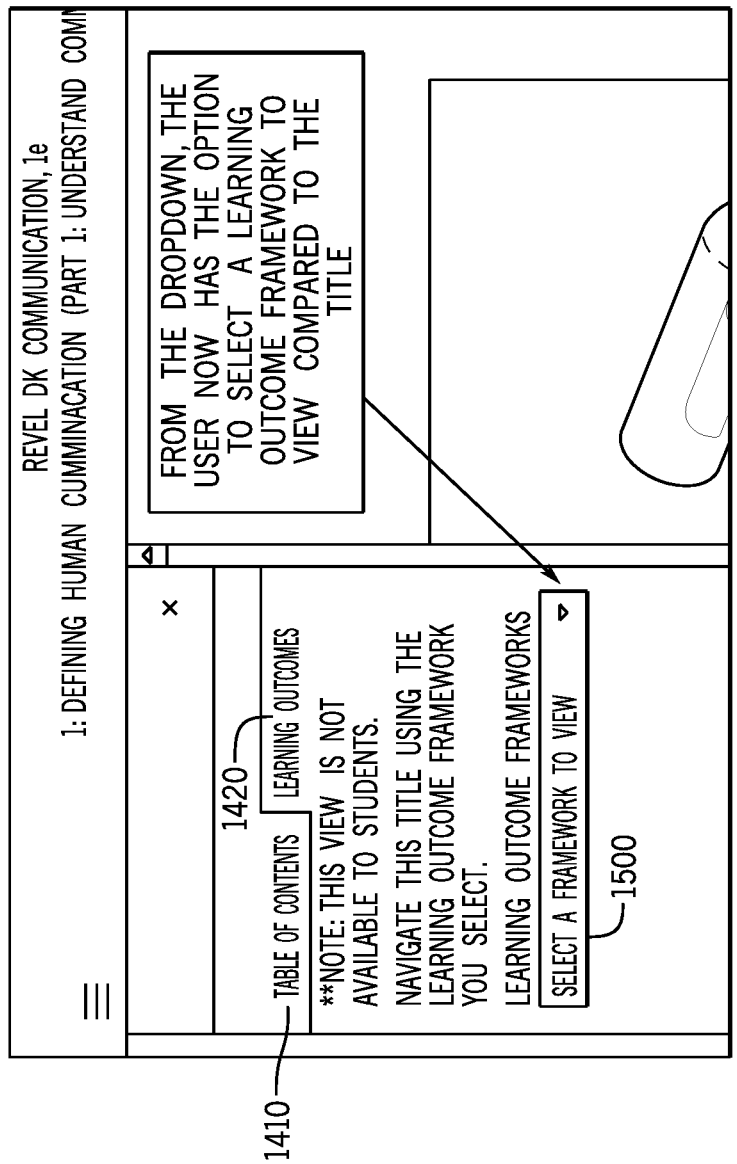
FIG. 20 illustrates a non-limiting example user interface for navigating a table of contents for a learning resource and associated learning objectives and outcomes.
Figure 21:
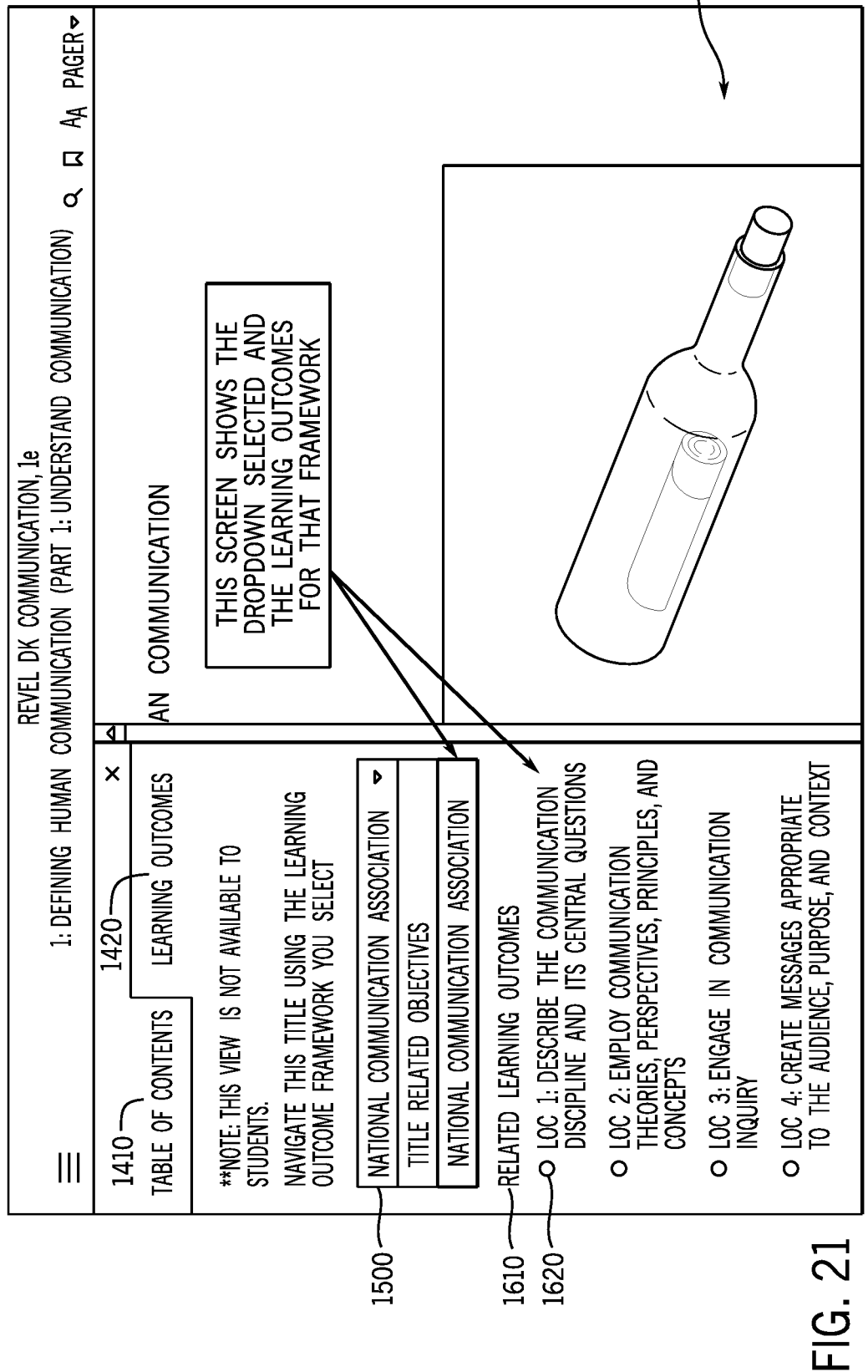
FIG. 21 illustrates a non-limiting example user interface for navigating a table of contents for a learning resource and associated learning objectives and outcomes.
Figure 22:
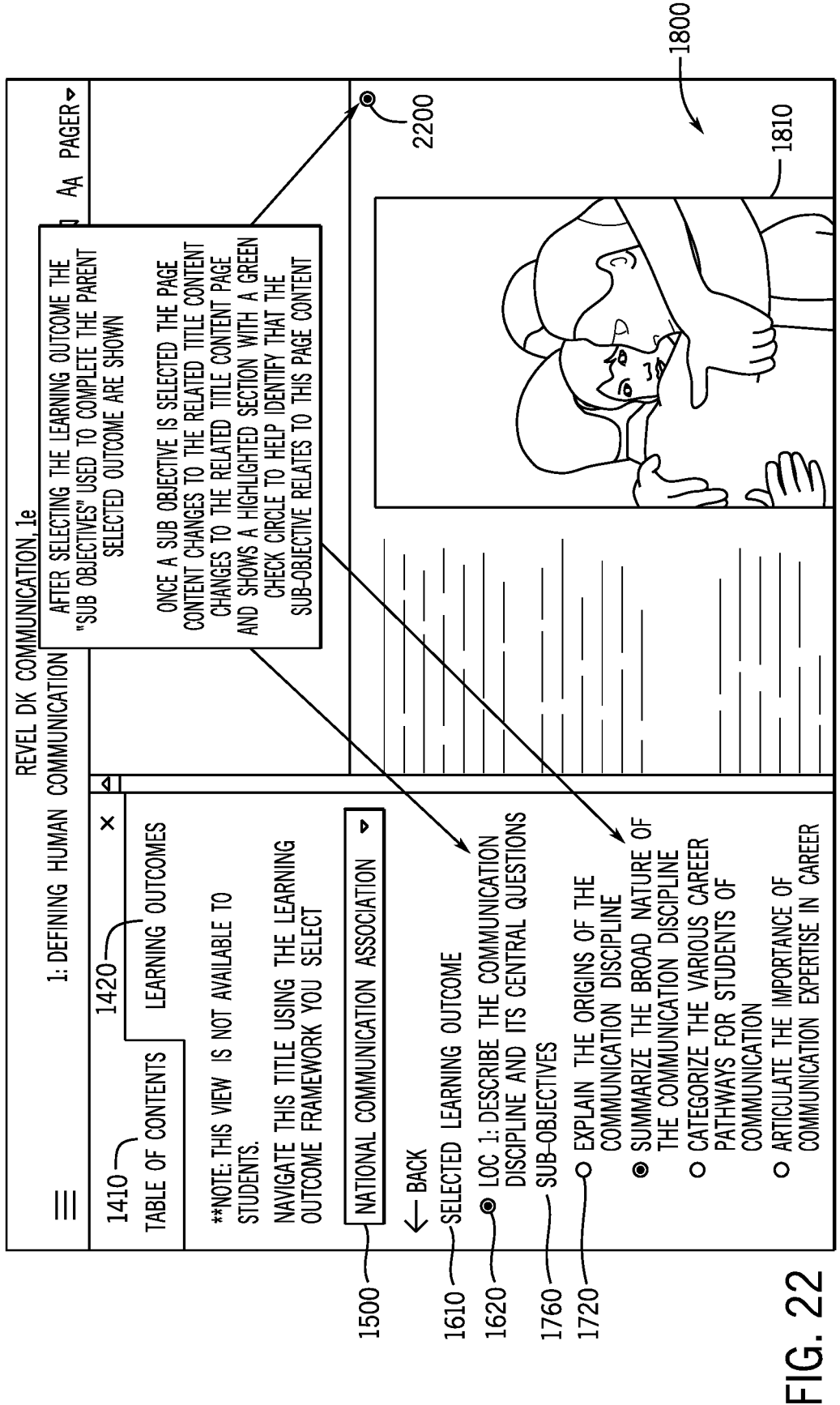
FIG. 22 illustrates a non-limiting example user interface for navigating a table of contents for a learning resource and associated learning objectives and outcomes.
Figure 23:
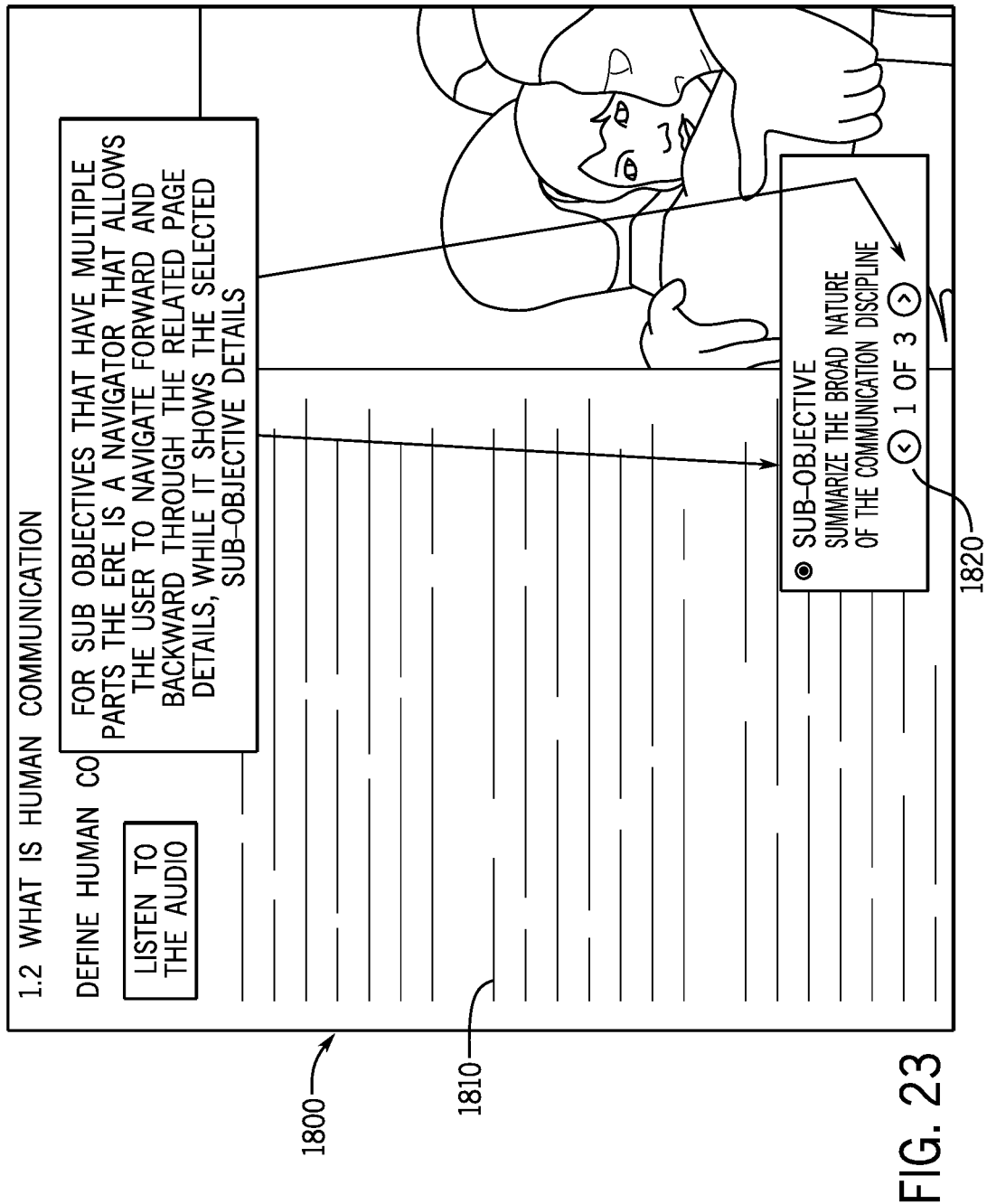
FIG. 23 illustrates a non-limiting example user interface for navigating a table of contents for a learning resource and associated learning objectives and outcomes.

FIGS. 19-23 represent steps taken by a user navigating an example embodiment of the disclosure: FIG. 19 demonstrates a user clicking on the learning outcomes tab 1420; FIG. 20, demonstrates a user selecting a learning outcome framework 310 from the drop down menu 1510 to view the content associated with the learning resource 1000. FIG. 21 demonstrates a selection made within the dropdown menu 1510, and the displayed learning objectives 1610 for the selected framework. FIG. 22 demonstrates the selection of a learning outcome 1610 through GUI control 1620, and of a sub-objective 1710 through GUI control 1720. After the selection, content 1810 on display 1800 changes to content corresponding to the selected sub-objective 1710. Content corresponding to the sub-objective 1710 may, for example, be highlighted. The highlighted section may, for example, be marked with a graphical symbol, such as a check mark provided in a circle (for example, a green check mark, in some embodiments) to help identify that the sub-objective relates to this page content. FIG. 23 demonstrates sub-objectives 1710 that have multiple parts, and the associated navigator 1820 that allows the user to navigate forward and backward through the related page details, which shows the selected sub-objective details.

Figure 24:
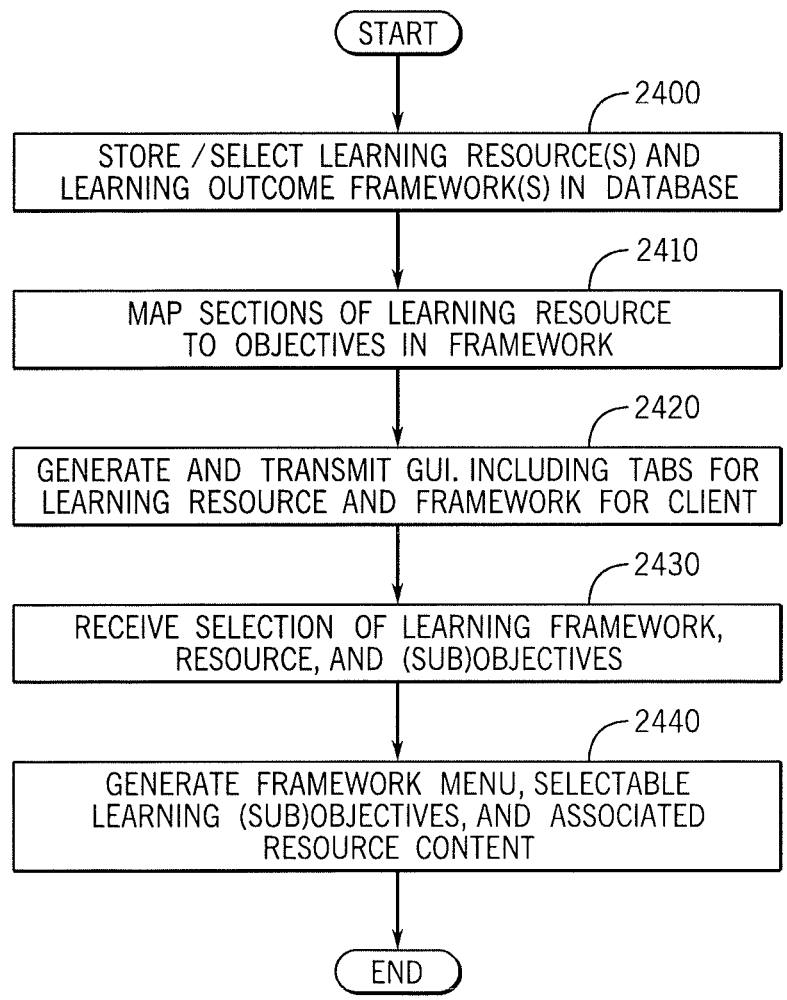
FIG. 24 illustrates a flow diagram including method steps for navigating a table of contents for a learning resource and associated learning objectives and outcomes.

In summary, FIG. 24 demonstrates a flow chart of method steps that may be performed using the server 112, and other hardware described with reference to FIGS. 1 and 2. In step 2400, learning resources and learning outcome frameworks may be stored in database 110. The system may then be configured to: execute a first database command selecting, from the database, a first learning resource in the plurality of learning resources, and a first learning outcome framework in the plurality of learning outcome frameworks (Step 2400); map a first section of the first learning resource to a first learning objective in the first learning outcome framework (Step 2410); generate a graphical user interface (GUI) for making selections associated with the first learning resource and the first learning outcome framework; transmit the GUI to a client device coupled to the network (Step 2420); receive, from the client device via the GUI, a selection of the first learning resource (Step 2430); automatically generate, for display on the GUI, a widget comprising a learning resource tab and a learning outcome framework tab (Step 2420); receive a selection of the learning outcome framework tab, and the first framework from within the learning outcome framework tab (Step 2430); automatically generate, for display on the GUI a first plurality of learning objectives, including the first learning objective (Step 2440); receive a selection of the first learning objective (Step 2430); and automatically generate, for display on the GUI, a content associated in the database with the first learning resource and the first learning objective (Step 2440).

Other embodiments and uses will be apparent to those having ordinary skill in the art upon consideration of the specification and practice of the disclosure disclosed herein. The specification and examples given should be considered exemplary only, and it is contemplated that the appended claims will cover any other such embodiments or modifications as fall within the true scope of the disclosure. For example, it will be apparent that, although tabs 1410 and 1420 are illustrated and described for selecting between tables of contents and learning objectives, various other types of menus, including, for example, a drop down menu, individual graphical controls, or other menus could be used. Similarly, although specific formats for graphical controls are described above, various graphical controls including radio buttons, dropdown menus or lists, menu bars, text boxes, check boxes, navigation bars, hyperlinks, and other elements may also be used. Further, as described above, graphical highlighting to illustrate, for example, content overlap can be provided in various ways including, by way of example, variations in fonts, sizes, colors, or shapes. Additionally, quantitative analyses can be illustrated by graphically displaying numerical percentages, as described above, or in other ways, including pie or bar charts, visual gauges, and other elements. Other variations will be apparent to those of skill in the art.

The Abstract accompanying this specification is provided to enable the United States Patent and Trademark Office and the public generally to determine quickly from a cursory inspection the nature and gist of the technical disclosure and in no way intended for defining, determining, or limiting the present disclosure or any of its embodiments.

The invention claimed is:

1. A system comprising:
a database storing:
a plurality of learning resources; and
a plurality of learning outcome frameworks, the database mapping content corresponding to each of the plurality of learning resources to at least one learning objective corresponding to at least one of the plurality of learning outcome frameworks;
at least one processor in communication with the database, the processor programmed to execute instructions within a memory which, when executed, cause the system to:
generate a graphical user interface (GUI) for selecting from the plurality of learning resources and the plurality of learning outcome frameworks;
receive, via the GUI, a selection of a first learning resource of the plurality of learning resources;
automatically generate, for display on the GUI, a menu including a learning outcome framework selector and a learning resource table of content selector;
receive, via the GUI, a selection of the learning outcome framework selector;
automatically generate a framework menu for selecting a first learning framework from the plurality of learning outcome frameworks;
receive, via the GUI, a selection of the first learning outcome framework;
automatically generate, for display on the GUI, a first plurality of learning objectives corresponding to the first learning outcome framework;
receive, via the GUI, a selection of a first learning objective of the plurality of learning objectives; and
automatically generate, for display on the GUI, content associated in the database with the first learning resource and the first learning objective, the content includes a table of contents corresponding to the first learning resource, wherein a portion of the table of contents is visually highlighted, wherein the portion of the table of contents corresponds to the first learning objective corresponding to the first learning objective framework.

2. The system of claim 1, wherein each of the learning resource table of content selector and the learning framework selector comprise a tab on the GUI.

3. The system of claim 1, wherein the menu for selecting a first learning framework from the plurality of learning outcome frameworks comprises a dropdown menu.

4. The system of claim 1, wherein the at least one learning resource outcome comprises a plurality of learning resource outcomes, and the system automatically generates GUI element enabling the user to page through the plurality of learning resource contents.

5. The system of claim 1, wherein, the system is further programmed to receive a selection of the learning resource table of contents selector, and, in response to the selection of the learning resource table of contents selector, to automatically display the table of contents corresponding to the first learning resource.

6. The system of claim 1, wherein each of the learning objectives is associated with a selectable sub-objective selection component, and wherein the system is further programmed to, upon receipt a selection of the sub-objective selection component, automatically display the sub-objectives corresponding to the associated learning objective.

7. The system of claim 6, wherein a content corresponding to a selected learning objective or a selected sub-objective is displayed upon receiving the selection.

8. The system of claim 1, wherein the instructions further cause the system to:
receive a selection of the first learning objective;
automatically generate, for display on the GUI, a plurality of learning sub-objectives;
receive a selection of a learning sub objective in the plurality of learning sub-objectives; and
automatically generate, for display on the GUI, a second content associated in the database with the first learning resource and the first learning sub-objective.

9. The system of claim 1, wherein the processor comprises a server in communication with a network.

10. The system of claim 9, wherein the processor is programmed to transmit the GUI to a client device in communication with the network.

11. A method comprising:
storing within a database coupled to at least one processor executing instructions within a memory:
a plurality of learning resources; and
a plurality of learning outcome frameworks, the database mapping content corresponding to each of the plurality of learning resources to at least one learning objective corresponding to at least one of the plurality of learning outcome frameworks;
generating a graphical user interface (GUI) for selecting from the plurality of learning resources and the plurality of learning outcome frameworks;
receiving, via the GUI, a selection of a first learning resource of the plurality of learning resources;
automatically generating, for display on the GUI, a menu including a learning outcome framework selector and a learning resource table of content selector;
receiving, via the GUI, a selection of the learning outcome framework selector;
automatically generate a framework menu for selecting a first learning framework from the plurality of learning outcome frameworks;
receiving, via the GUI, a selection of the first learning outcome framework;

automatically generating, for display on the GUI, a first plurality of learning objectives corresponding to the first learning outcome framework;

receiving, via the GUI, a selection of a first learning objective of the plurality of learning objectives; and automatically generating, for display on the GUI, content associated in the database with the first learning resource and the first learning objective, the content includes a table of contents corresponding to the first learning resource, wherein a portion of the table of contents is visually highlighted, wherein the portion of the table of contents corresponds to the first learning objective corresponding to the first learning objective framework.

12. The method of claim 11, further comprising the steps of:

receiving a selection of the first learning objective;

automatically generating for display on the GUI, a plurality of learning sub-objectives;

receiving a selection of a learning sub-objective in the plurality of learning sub-objectives; and automatically generating for display on the GUI, a second learning resource content associated in the database with the first learning resource and the first learning sub-objective.

13. The method of claim 11, wherein, further comprising receiving a selection of the learning resource table of contents selector, wherein the table of contents is displayed in response to the selection of the learning resource table of contents selector.

14. A system comprising:

a database storing:

at least one learning resource, the at least one learning resource divided into a plurality of sections; and a plurality of learning outcome frameworks, each of the learning outcome frameworks including a plurality of learning outcomes, the database mapping at least one of the sections of each of the at least one learning resource to a corresponding learning outcome of at least one learning outcome framework of the plurality of learning outcome frameworks;

a processor executing instructions within a memory which, when executed, cause the system to:

generate a graphical user interface (GUI), including GUI controls for selecting one of the plurality of learning outcome frameworks for comparison to the at least one learning resource;

receive, via the GUI controls, a selection of a first learning outcome framework of the plurality of learning outcome frameworks;

execute a first database command selecting, from the database, the plurality of learning objectives corresponding to the first learning outcome framework;

automatically generate, for display on the GUI, a table correlating the plurality of learning objectives corresponding to the first learning outcome framework to a plurality of sections of the at least one learning resource, the table including graphic indicators illustrating a level of correlation between each of the plurality of the learning objectives and at least a section of the at least one learning resource.

15. The system of claim 14, wherein the graphic indicators comprise geometric shapes, and wherein a size of the geometric shape varies based on the level of correlation between the learning objective and the corresponding section of the at least one learning resource.

16. The system of claim 14, wherein the graphic indicator comprises a calculated percentage value of correlating the learning outcome to the corresponding section of the at least one learning resource.

17. The system of claim 14, wherein the at least one learning resource corresponds to a text and each of the at least one section corresponds to a chapter in the text.

18. The system of claim 14, wherein the GUI controls for selecting one of the plurality of learning outcome frameworks for comparison to the at least one learning resource are visually highlighted to provide an indication of a level of overlap between the learning resource and the learning outcome framework.

* * * * *